United States Patent [19]

Nakagawa

[11] Patent Number: 5,218,250

[45] Date of Patent: Jun. 8, 1993

[54] STRONG MAGNETIC THRUST FORCE TYPE ACTUATOR

[75] Inventor: Hiroshi Nakagawa, Mie, Japan

[73] Assignee: Shinko Electric Company Ltd., Tokyo, Japan

[21] Appl. No.: 440,623

[22] Filed: Nov. 22, 1989

[30] Foreign Application Priority Data

Nov. 22, 1988 [JP] Japan .............................. 63-295365
Nov. 29, 1988 [JP] Japan .............................. 63-301965

[51] Int. Cl.$^5$ ............................................ H02K 41/00
[52] U.S. Cl. ........................................ 310/12; 310/156
[58] Field of Search .......................... 310/12, 154, 156

[56] References Cited

U.S. PATENT DOCUMENTS 4,713,570 12/1987 Mastromattei ..................... 310/154
4,728,830 3/1988 Gamble ................................ 310/12

FOREIGN PATENT DOCUMENTS 0348851 1/1990 European Pat. Off. ............. 310/12
0110048 4/1989 Japan ................................... 310/12

Primary Examiner—Steven L. Stephan
Assistant Examiner—Judson H. Jones
Attorney, Agent, or Firm—Schwartz & Weinrieb

[57] ABSTRACT

A strong magnetic thrust force type actuator includes two types of actuators. In accordance with a first type of actuator, a permanent magnet is inserted into respective grooves formed within the facing portions of the primary magnetic member. When the insulated wires are activated in connection with the primary magnetic member, a magnetic flux flows toward the facing portions of one magnetic pole, these facing portions are arranged at the S-pole sides of the permanent magnets, the magnetic flux then emerges from the N-pole sides of the permanent magnets, and flows into the facing portions of the secondary magnetic member. This magnetic flux then flows from the secondary magnetic member into the facing portions of the other magnetic pole disposed at the S-pole sides of the permanent magnets, and then flows through the permanent magnets so as to make a complete magnetic flux loop. In accordance with a second type of actuator, the permanent magnet is inserted into respective grooves formed within the facing portions of the secondary magnetic member. In this case, a magnetic flux flows from the facing portions of one magnetic pole to the facing portions disposed at the S-pole sides of the permanent magnets, then emerges from the N-pole sides of the permanent magnets, and flows toward the facing portions disposed at the S-pole sides of the permanent magnets, and then flows into the facing portions of the other magnetic pole so as to make a complete magnetic flux loop. Thus, as long as the magnetic poles are activated, all facing portions of the magnetic poles contribute to the production of the magnetic thrust.

24 Claims, 29 Drawing Sheets

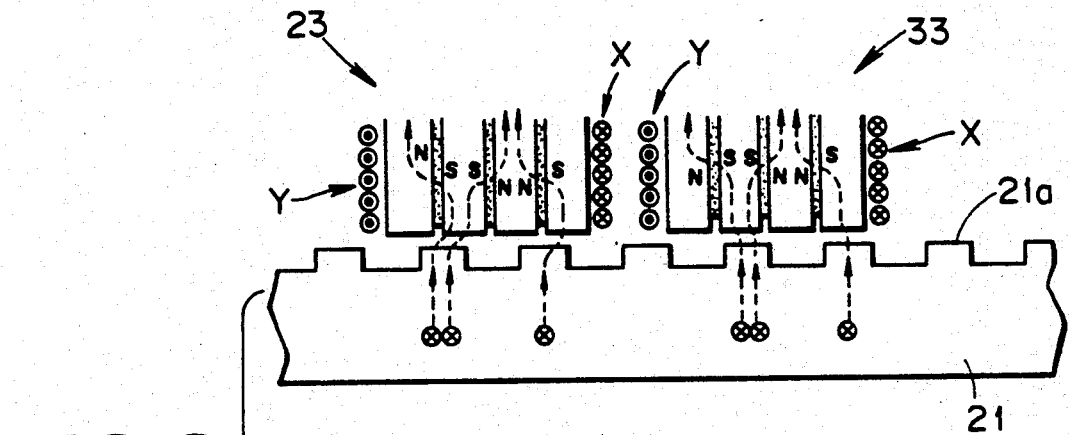
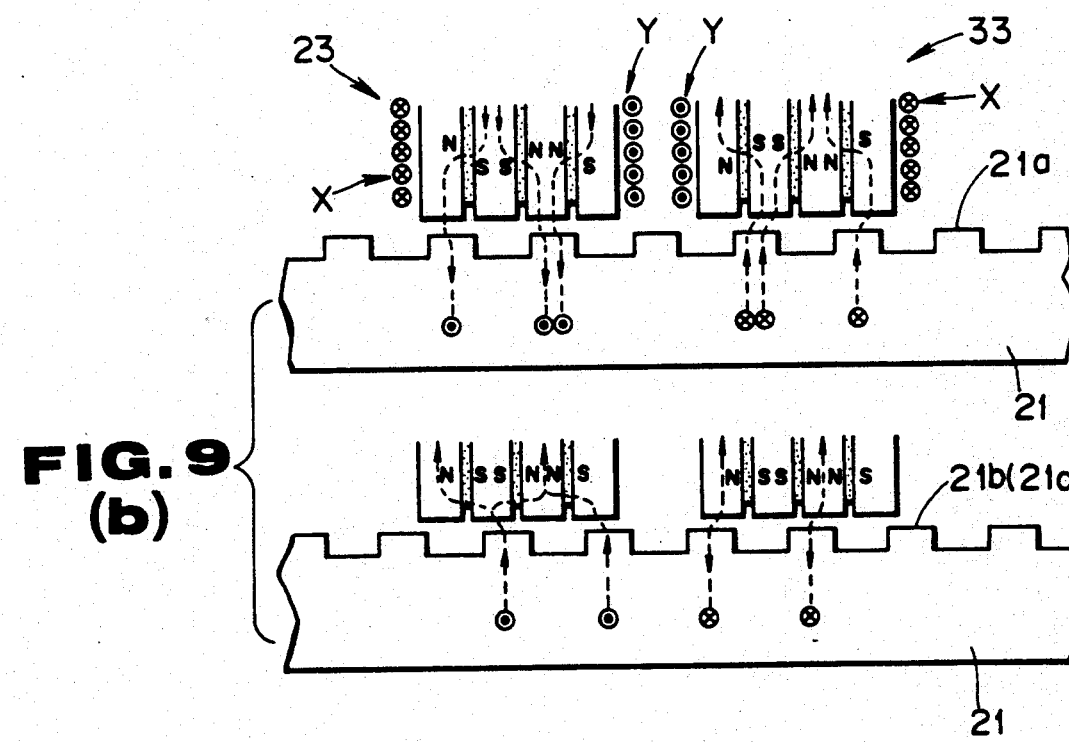
FIG. 9 (a)
FIG. 9 (b)

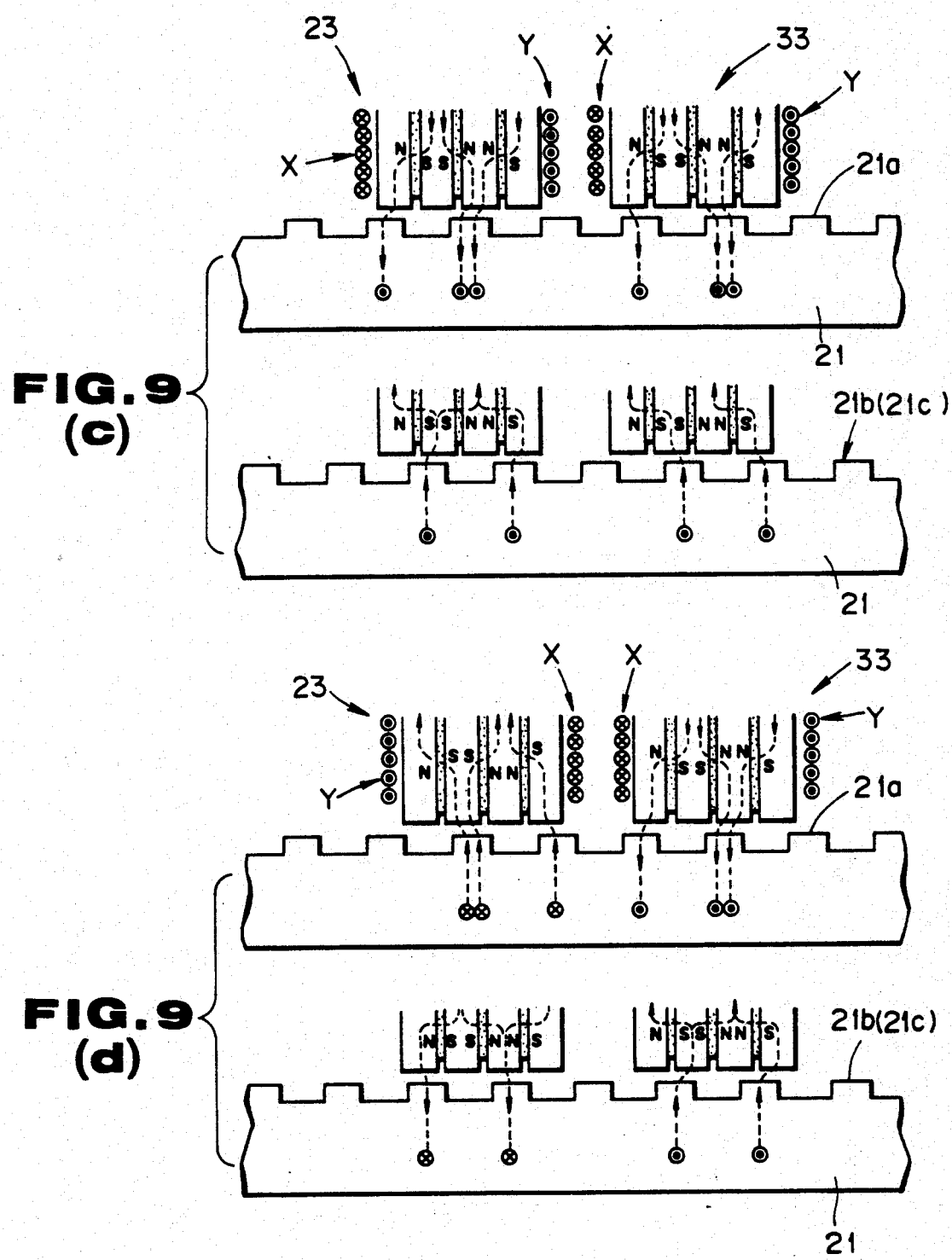

STRONG MAGNETIC THRUST FORCE TYPE ACTUATOR

BACKGROUND OF THE INVENTION

1. Field of the Invention

The present invention relates generally to magnetic actuators, and more particularly to a strong magnetic thrust force type actuator for producing a relatively large magnetic thrust for use within an industrial robot, or the like.

2. Prior Art

Conventional linear pulse motors comprise a primary member and secondary member. Generally the primary member is an electrically supplied member, or in other words, an electromagnetically excited member. Accordingly, the primary member travels along the secondary member in a linearly reciprocating to and fro direction when a pulse current is supplied to the primary member. In this case, the primary member is movable, while the secondary member is stationary, however, either the primary or secondary member can be movable.

FIG. 1 shows a conventional linear pulse motor. Numeral 1 designates a secondary member which is an elongate magnetic material plate, the upper side of which forms rectangular teeth 1a and grooves 1b along the longitudinal direction at a constant pitch. Above the teeth 1a and grooves 1b, primary member 2 is positioned at a predetermined distance from secondary member 1 so as to define a space therebetween. This primary member 2 is movably supported by means of a supporting member such as, for example, a roller, wheel, or the like.

Primary member 2 comprises core 4 for the A-phase and core 5 for the B-phase, there being provided magnetic poles 4a and 4b for core 4, and magnetic poles 5a and 5b for core 5; coils 6a and 6b wound around magnetic poles 4a and 4b, respectively; coils 7a and 7b wound around magnetic poles 5a and 5b, respectively; permanent magnets 8 and 9 disposed upon cores 4 and 5, in which the N-pole of permanent magnet 8 faces the upper surface of core 4, while the S-pole of permanent magnet 9 faces the upper surface of core 5; and cover plate 10, formed by means of a magnetic material, which covers permanent magnets 8 and 9. The lower side of magnetic pole 4a has pole teeth 14a and grooves 14c, each of which is formed at a constant pitch. The lower sides of magnetic poles 4b, 5a, and 5b have similar pole teeth 14b, 15a, and 15b, and grooves 14d, 15c, and 15d, respectively.

Assuming that the constant pitch of rectangular teeth 1a is indicated by means of the distance P, each of the pole teeth 14b, 15a, and 15b is shifted by means of a distance of P/4 with respect to rectangular teeth 1a as shown in FIG. 2, and the lower surfaces of these teeth are positioned at a distance G from the upper surface of teeth 1a.

Accordingly, in turn, by supplying a pulse current to coils 6a, 6b, 7a, and 7b, a magnetic flux is generated, respectively. This magnetic flux and the magnetic flux from permanent magnets 8 and 9, in turn, act upon respective magnetic poles 4a, 4b, 5a, and 5b, allowing primary member 2 to travel along secondary member 1 in the longitudinal direction.

Next, in FIG. 2(a) to FIG. 2(d), primary member 2 traveling along secondary member 1 is described as a result of being based upon a two-phase exciting system which supplies a pulse current to coils 6a and 6b in one group, and coils 7a and 7b in the other group. This pulse current energizes magnetic poles 4a, 4b, 5a, and 5b.

In FIG. 2(a), by supplying the pulse current from terminal 6c to terminal 6d through means of coils 6a and 6b as shown by means of the direction of the arrows, and also, by supplying this pulse current from terminal 7d to terminal 7c through means of coils 7a and 7b, as shown by means of the direction of the arrows, the magnetic flux generated from coil 6a is added to the magnetic flux generated from permanent magnet 8 at magnetic pole 4a for the A-phase, and each of these magnetic fluxes at magnetic pole 4b for the A-phase opposes the other. On the other hand, the magnetic flux generated from coil 7a is added to the magnetic flux generated from permanent magnet 9 at magnetic pole 5a for the B-phase, and each of these magnetic fluxes at magnetic pole 5b for the B-phase opposes the other. Magnetic flux $\phi_1$ is thus generated in the direction of the arrows as shown in FIG. 2(a). As a result, the magnetic field acts upon pole teeth 14a and 15a facing rectangular teeth 1a so as to produce a magnetic thrust.

In FIG. 2(b), by supplying the pulse current to coils 6a and 6b in the same direction as shown in FIG. 2(a), and also, by supplying a pulse current to coils 7a and 7b in the opposite direction with respect to the direction shown in FIG. 2(a), magnetic flux $\phi_2$ is thus generated in the direction of the arrows as shown in FIG. 2(b). As a result, the magnetic field acts upon pole teeth 14a and 15b facing rectangular teeth 1a so as to produce magnetic thrust.

In FIG. 2(c), by supplying the pulse current to coils 6a and 6b in the opposite direction with respect to the direction shown in FIG. 2(b), and by supplying the pulse current to coils 7a and 7b in the same direction as shown in FIG. 2(b), magnetic flux $\phi_3$ is thus generated in the direction of the arrows as shown in FIG. 2(c). As a result, the magnetic field acts upon pole teeth 14b and 15b facing rectangular teeth 1a so as to produce the magnetic thrust.

Similarly, in FIG. 2(d), by supplying the pulse current to coils 6a and 6b in the same direction as shown in FIG. 2(C), and to coils 7a and 7b in the opposite direction with respect to the direction shown in FIG. 2(c), magnetic flux $\phi_4$ is thus generated in the direction of the arrows as shown in FIG. 2(d). As a result, the magnetic field acts upon pole teeth 14b and 15a facing rectangular teeth 1a so as to produce the magnetic thrust.

Accordingly, the pulse current is, in turn, supplied to respective coils 6a, 6b, 7a, and 7b in the successive order of such FIG. 2(a), FIG. 2(b), FIG. 2(c), and FIG. 2(d). This allows primary member 2 to travel toward the right in the drawings, that is, from magnetic pole 4a to magnetic pole 5b, while when the pulse current is, in turn, supplied to the respective coils in the decreasing order of such FIG. 2(d), FIG. 2(c), FIG. 2(b), and FIG. 2(a), primary member 2 is caused to travel toward the left in the drawing, that is, from magnetic pole 5b to magnetic pole 4a.

Generally, such a linear pulse motor is thus used without a closed-loop control circuit for accurately positioning an object at a certain position, which makes the driving device useful for office automation equipment such as, for example, printers. However, it is difficult to use this type of device in industrial robots because of the high magnetic thrust required.

According to the linear pulse motor described above, in FIG. 2(a), while generating the magnetic thrust at magnetic poles 4a and 5a, each of the magnetic fluxes is counteracted at magnetic poles 4b and 5b, respectively. A resultant magnetic thrust is thus not generated at magnetic poles 4b and 5b. A similar magnetic thrust is generated at magnetic poles 4a and 5b in FIG. 2(b), magnetic poles 4b and 5b in FIG. 2(c), and magnetic poles 4b and 5a in FIG. 2(d). As a result, the area of magnetic poles 4a, 4b, 5a, and 5b which can generate the magnetic thrust is only 50% of the total pole area. This area is significant in that it produces the magnetic thrust.

OBJECT OF THE INVENTION

It is accordingly an object of the present invention to provide a strong magnetic thrust force type actuator capable of effectively using the area of the magnetic poles so as to produce a large magnetic thrust.

SUMMARY OF THE INVENTION

In accordance with an aspect of the present invention, there is provided a strong magnetic thrust force type actuator including:

a primary magnetic member supported by a support means moving along a predetermined direction, the primary magnetic member generating a magnetic field from magnetic poles thereof; and a secondary magnetic member having a plurality of facing portions facing the magnetic poles of the primary magnetic member, in which the facing portions are disposed at a constant pitch in the predetermined direction, thus moving the primary magnetic member relative to the secondary magnetic member when a magnetic field acts upon the facing portions formed by means of the secondary magnetic member, the improvement wherein the primary magnetic member comprises:

a core member having facing portions and grooves alternately disposed at a first constant pitch in the predetermined direction, the facing portions and grooves extending in a direction transverse to the predetermined direction;

a plurality of permanent magnets inserted into respective grooves extending in a direction perpendicular to a facing surface of the facing portions so that each of the adjacent permanent magnets is of an opposite polarity; and an insulated wire wound around the core member so as to form a magnetic pole, and wherein further the secondary magnetic member comprises:

facing portions facing the facing portions of the core member, the facing portions of the secondary member disposed at a second constant in the predetermined direction, the second constant pitch being approximately twice as large as the first constant pitch of the facing portions formed by means of the primary magnetic member.

In accordance with a second aspect of the present invention, there is provided a strong magnetic thrust force type actuator including:

a primary magnetic member supported by a support means for movement along a predetermined direction, the primary magnetic member generating a magnetic field from magnetic poles thereof; and a secondary magnetic member having a plurality of facing portions facing the magnetic poles of the primary magnetic member, in which the facing portions are disposed at a constant pitch in the predetermined direction, thus moving the primary magnetic member relative to the secondary magnetic member when a magnetic field acts upon the facing portions formed by means of the secondary magnetic member, the improvement wherein the primary magnetic member comprises:

a core member having facing portions disposed at a first constant pitch in the predetermined direction, the facing portions of the core member extending in a direction transverse to the predetermined direction; and an insulated wire wound around the core member so as to form a magnetic pole, and wherein further the secondary member comprises:

facing portions and grooves facing the facing portions of the core member, the facing portions and grooves of the secondary magnetic member being alternately disposed at a second constant pitch in the predetermined direction, and extending in a direction transverse to the predetermined direction; and a plurality of magnets inserted into respective grooves extending in a direction perpendicular to each facing surface of the facing portions so that each of the adjacent permanent magnets is of an opposite polarity, the first constant pitch being approximately twice as large as the second constant pitch of the facing portions formed by means of the secondary magnetic member.

Accordingly, when the magnetic poles are activated by supplying a pulse current to the insulated wires wound around the magnetic poles formed by means of the primary magnetic member, all facing portions of the magnetic poles can contribute to produce a strong magnetic thrust, which moves the primary magnetic member relative to the secondary magnetic member.

BRIEF DESCRIPTION OF THE DRAWINGS

Various other objects, features, and attendant advantages of the present invention will become better understood from the following detailed description, when considered in connection with the accompanying drawings, in which like reference characters designate like or corresponding parts throughout the several views, and wherein:

FIG. 9(a) to FIG. 9(d) are side views showing the operation of the linear pulse motor when both coils are energized in accordance with the various different modes;

DESCRIPTION OF THE ILLUSTRATED EMBODIMENTS

Hereinafter, embodiments of the present invention will be described by reference to the drawings.

Figure 1:
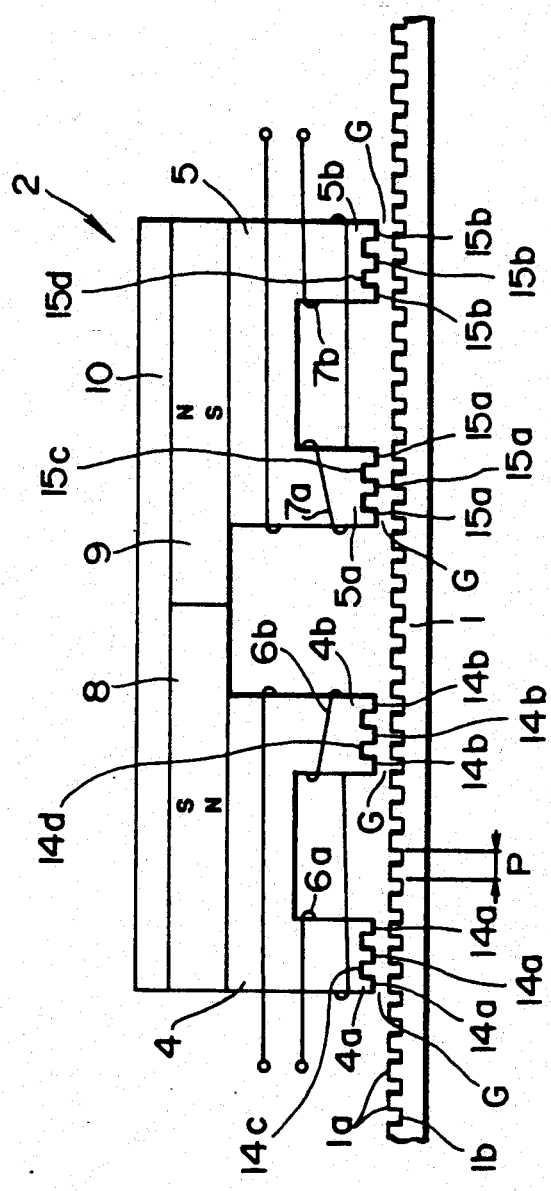
FIG. 1 is a side view showing a conventional linear pulse motor.
Figure 2A:
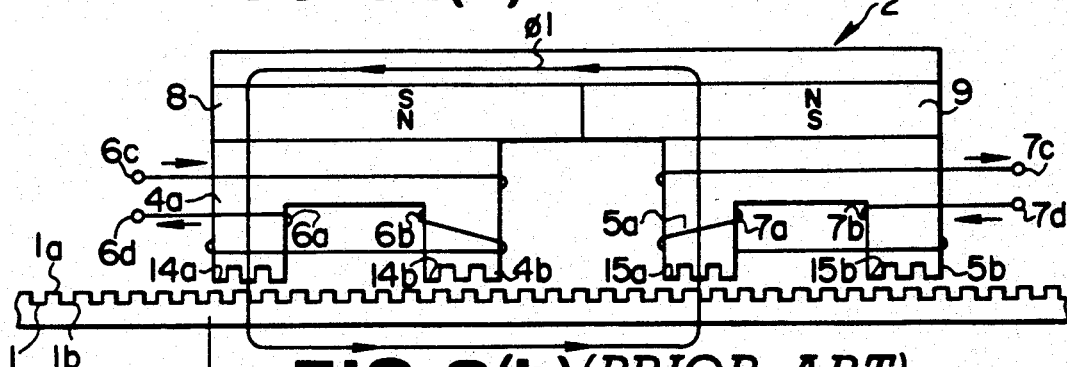
FIG. 2(a) to FIG. 2(d) are side views of the motor of FIG. 1 showing the operation of the conventional linear pulse motor when the motors of the coils associated with the magnetic poles have pulse current flowing therethrough in various different modes.
Figure 2B:
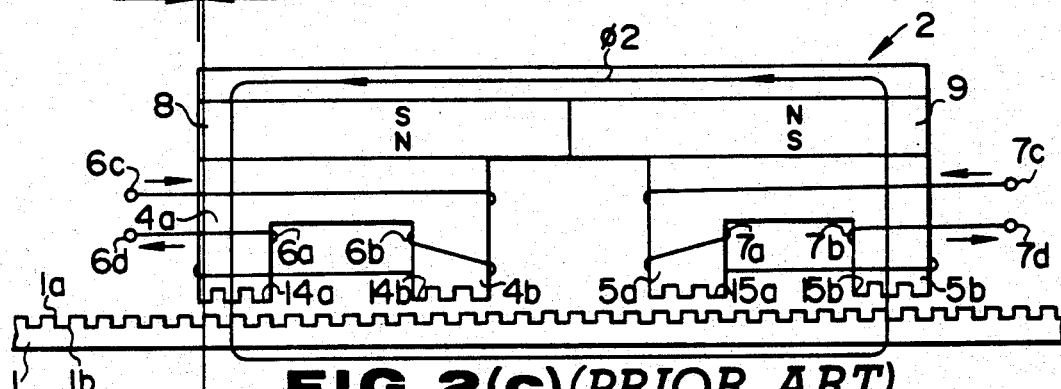
Figure 2C:
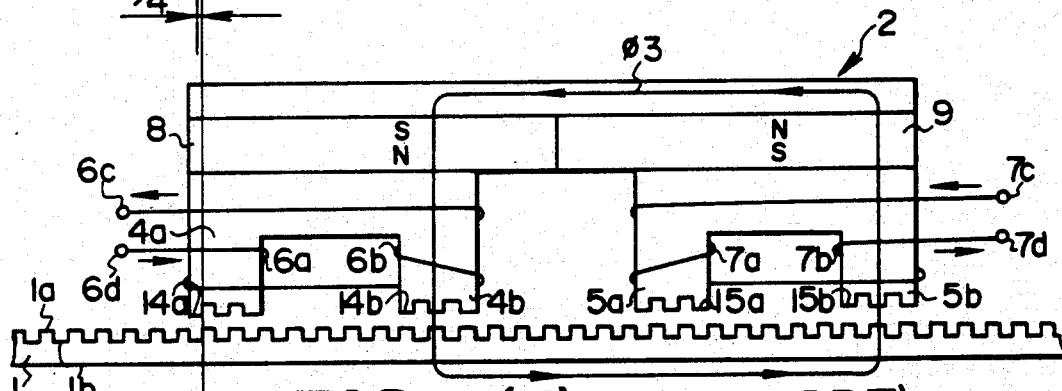
Figure 2D:
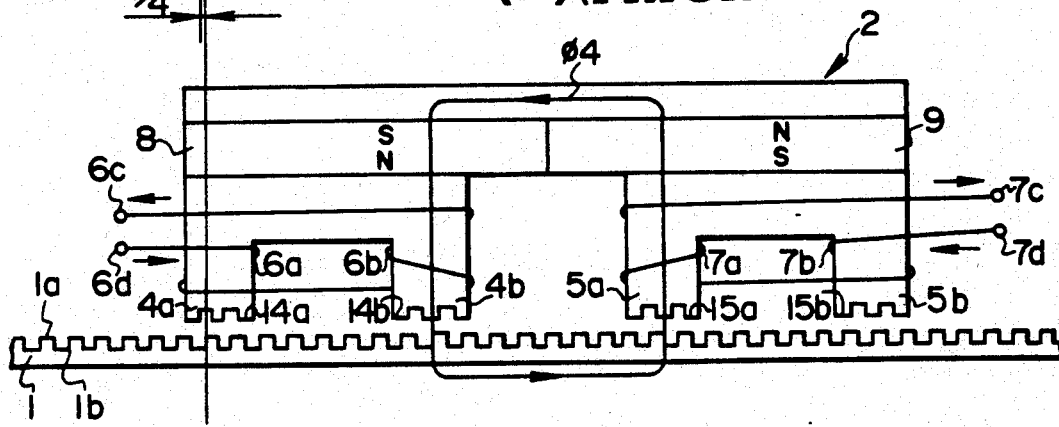
Figure 3:
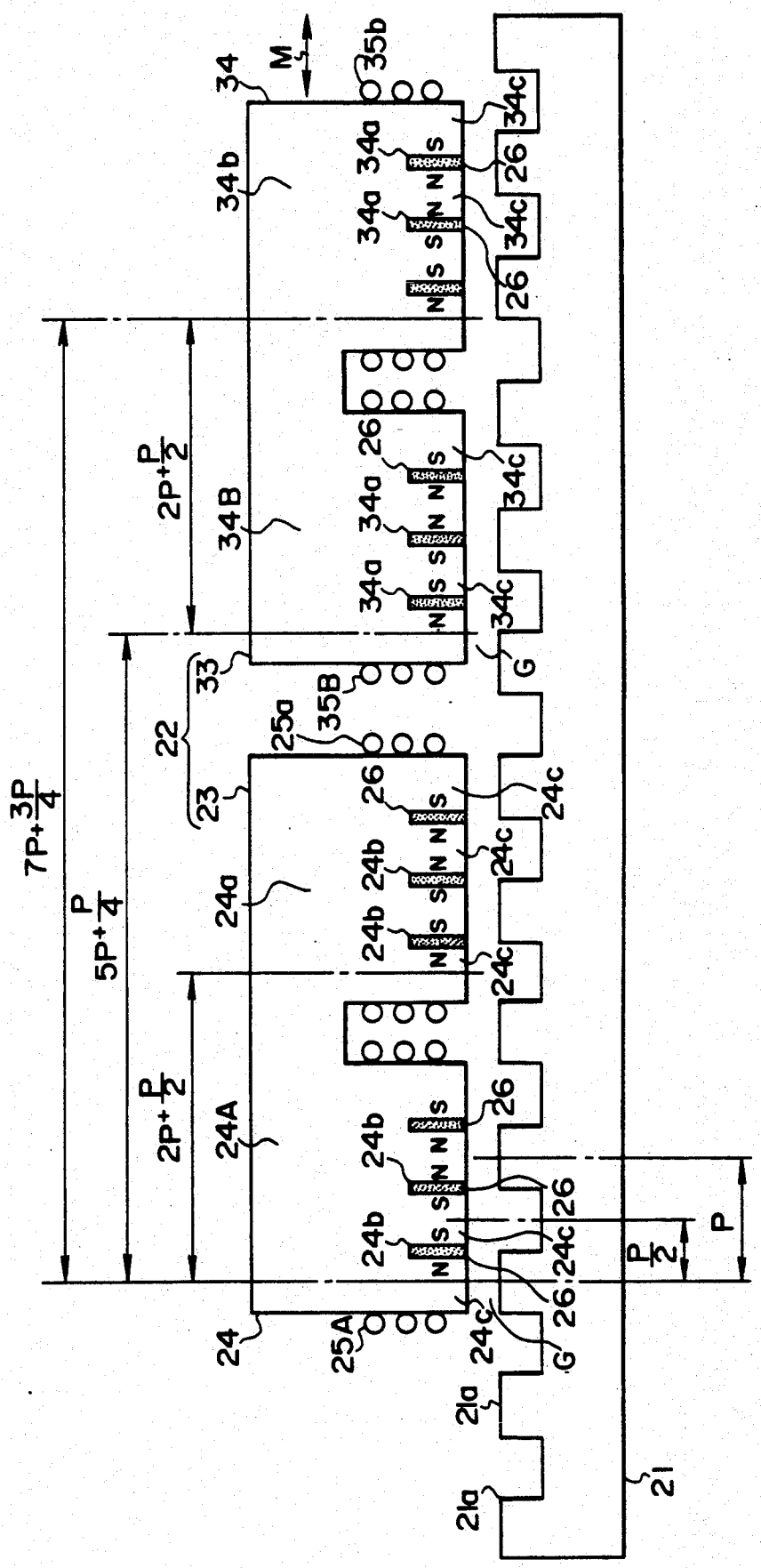
FIG. 3 is a side view showing a linear pulse motor constructed in accordance with a first embodiment of the present invention.

FIG. 3 shows a first embodiment of the invention as comprising a strong magnetic force type actuator. This strong magnetic force type actuator is shown as a linear pulse motor. In this drawing, numeral 21 designates a secondary magnetic member at a fixed position, and numeral 22 designates a primary magnetic member movably supported at a constant distance G with respect to the secondary member by a support means such as, for example, rollers, wheels, or the like. Primary magnetic member 22 thus travels along a longitudinal direction, or the traveling direction shown by means of arrow M. The support means is not shown in FIG. 3 for the sake of simplicity.

Upon the upper side of the secondary magnetic member 21, a single-row of rectangular teeth 21a is formed in the longitudinal direction. Each of the rectangular teeth 21a is formed at a constant pitch, at the distance of P, and therefore, the longitudinal axis of each rectangular tooth 21a is formed in the direction transverse to the longitudinal direction of secondary magnetic member 21.

A-phase block 23 comprises U-shaped core 24 having +A-phase magnetic pole 24A, and −A-phase magnetic pole 24a, both of which are disposed toward the rectangular teeth 21a of secondary magnetic member 21; and coil 25A and coil 25a both wound around +A-phase magnetic pole 24A and −A-phase magnetic pole 24a, respectively. Each lower surface of the +A-phase magnetic pole 24A and −A-phase magnetic pole 24a has grooves 24b and rectangular teeth 24c defined therein at a constant pitch comprising the distance of P/2, in the longitudinal direction, or in other words, the longitudinal axis of each tooth 24c is disposed in a direction transverse to the longitudinal direction. Permanent magnets 26 are then inserted into respective grooves 24b so that each of the adjacent permanent magnets 26 is of an opposite polarity.

On the other hand, B-phase block 33 has an identical construction as that of A-phase block 23, that is, it has U-shaped core 34 having +B-phase magnetic pole 34B and −B-phase magnetic pole 34b, both of which are disposed toward rectangular teeth 21a of secondary magnetic member 21; and coil 35B and coil 35a both wound around +B-phase magnetic pole 34B and −B-phase magnetic pole 34b, respectively. Each lower surface of the +B-phase magnetic pole 34B and −B-phase magnetic pole 34b has grooves 34a and rectangular teeth 34c defined therein at a constant pitch, that is, at a distance of P/2, and permanent magnets 26 are inserted into respective grooves 34a so that each of the adjacent permanent magnets 26 is of an opposite polarity.

In FIG. 3, assuming that a reference line is set at the center of the left-most end rectangular tooth 24c of +A-phase magnetic pole 24A as a vertical center reference line of the rectangular teeth 24c, the center of the left-most end rectangular tooth, 24c of −A-phase magnetic pole 24a is positioned at the distance of 2P+P/2 with respect to such reference line. The center of the left-most end rectangular tooth 34c of +B-phase magnetic pole 34B is positioned at a distance of 5P+P/4 with respect to such reference line, and the center of the left-most end rectangular tooth 34c of −B-phase magnetic pole 34b is then positioned at the distance of 7P+3P/4 with respect to such reference line, or 2P+P/2 with respect to the vertical center line of the left-most end rectangular tooth 34c formed within +B-phase magnetic pole 34B.

Accordingly, when the first and third rectangular teeth 24c of +A-phase magnetic pole 24A are disposed directly above rectangular teeth 21a, each of the rectangular teeth 24c of −A-phase magnetic pole 24 is shifted by means of a distance of P/2 with respect to rectangular teeth 21a, each of the rectangular teeth 34c of +B-phase magnetic pole 34B is shifted by means of a distance of P/4 with respect to rectangular teeth 21a, and each of the rectangular teeth 34c of −B-phase magnetic pole 34b is shifted by means of a distance of 3P/4 with respect to rectangular teeth 21a.

The operation of this linear pulse motor is described by reference to FIG. 4(a) through FIG. 4(d), in the case in which a pulse current is supplied to coils 25A and 25a in one group, and to coils 35B and 35b in the other group, so as to cause primary magnetic member 22 to move along secondary magnetic member 21 by means of a single-phase exciting system.

Figure 4A:
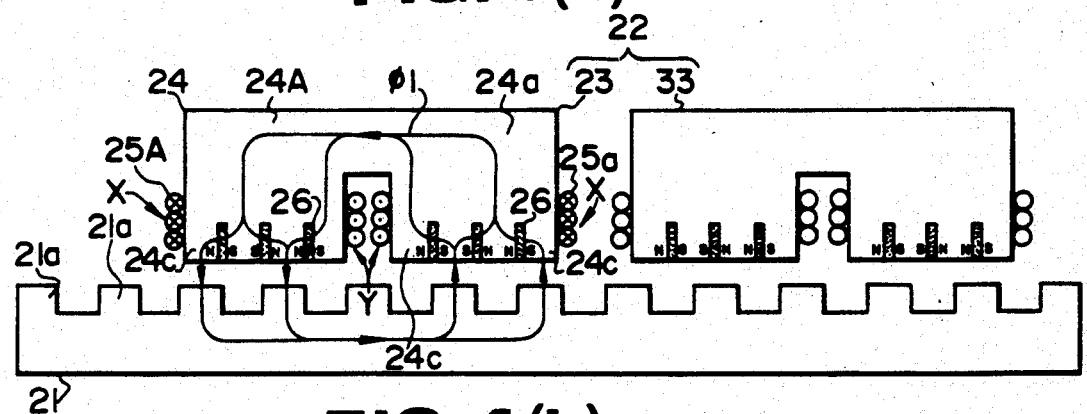
FIG. 4(a) to FIG. 4(d) are side views showing the operation of the linear pulse motor of FIG. 3 in accordance with various pulse current modes.

In FIG. 4(a), the pulse current flows from point X to point Y through means of coils 25A and 25a. This causes a magnetomotive force within core 24 to generate a magnetic flux from −A-phase magnetic pole 24a to +A-phase magnetic pole 24A. In +A-phase magnetic pole 24A, the magnetic flux flows into the S-pole side of each permanent magnet 26, and emerges from the N-pole side of each permanent magnet 26, and then flows into rectangular teeth 24c. This magnetic flux then flows from rectangular teeth 24c of a +A-phase magnetic pole 24A to rectangular teeth 21a of secondary magnetic member 21, and then flows through secondary magnet 26cetic member 21 toward the side of −A-phase magnetic pole 24a as shown by means of the arrow direction; the flux then flows into the S-pole side of each permanent magnet 26 through means of rectangular teeth 24c of −A-phase magnetic pole 24a, then emerges from the N-pole side of each permanent magnet 26, and then passes into the adjacent rectangular teeth 24c so as to return to the S-pole side of each permanent magnet 26 of +A-phase magnetic pole 24A. This constitutes magnetic flux loop o1. Accordingly, as long as the pulse current flows within the coils wound around A-phase block 23, all rectangular teeth 24c can contribute to the production of a magnetic thrust which is much stronger than that produced within the conventional linear pulse motor.

Figure 4B:
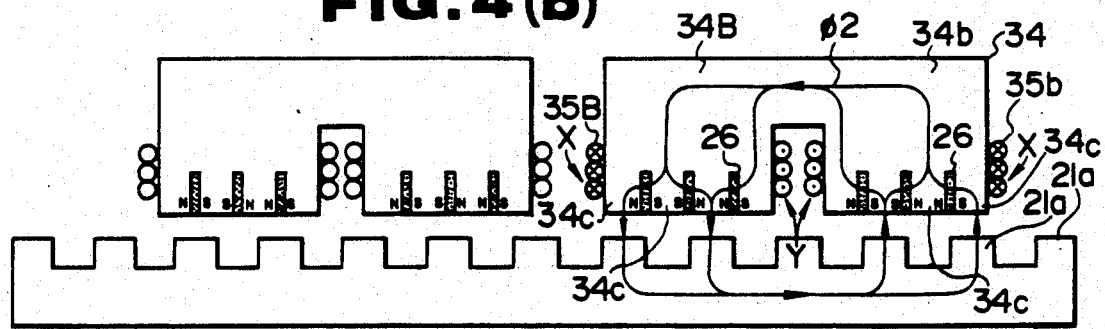

In FIG. 4(b), the pulse current flows from point X to point Y corresponding to coils 35A and 35b. This causes a magnetomotive force within core 34 to generate a magnetic flux from −B-phase magnetic pole 34b to +B-phase magnetic pole 34B. Thus, this magnetic flux flows into the S-pole side of each permanent magnetic 26, and emerges from the N-pole side of each permanent magnet 26, then flows into rectangular teeth 34c of the +B-phase magnetic pole 34B. This magnetic flux then flows from rectangular teeth 34c of +B-phase magnetic pole 34B to rectangular teeth 21a of secondary magnetic member 21, through secondary magnetic member 21 toward the side of the −B-phase magnetic pole 34b as shown by means of the arrow direction, and into the S-pole side of each permanent magnet 26 of the −B-phase pole 34b, and emerges from the N-pole side of each permanent magnet 26, and into the adjacent rectangular teeth 34c of the −B-phase pole 34B so as to return to the S-pole side of each permanent magnet 26 of the +B-phase magnetic pole 34B. This constitutes magnetic flux loop $\phi_2$. Accordingly, all rectangular teeth 34c of core 34 can contribute to the production of a magnetic thrust.

Figure 4C:
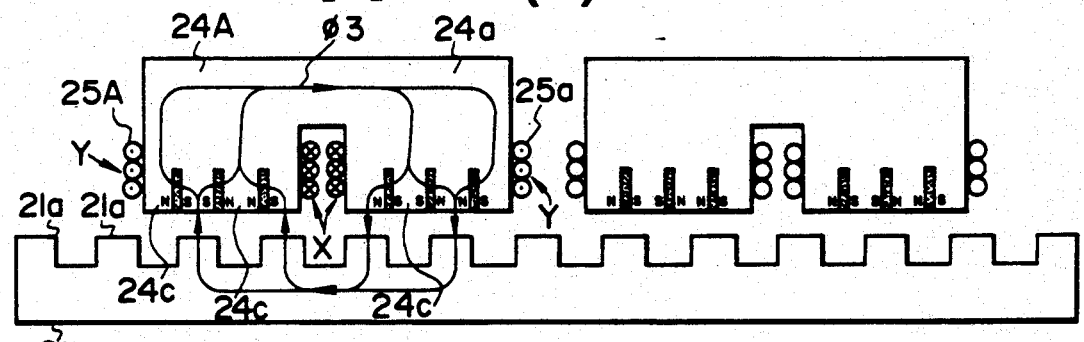

Similarly, in FIG. 4(c), the pulse current flows from point X to point Y corresponding to coils 25A and 25a in the opposite direction with respect to the direction shown in FIG. 4(a). This constitutes magnetic flux loop $\phi_3$. As a result, all rectangular teeth 24c can contribute to the production of the magnetic thrust.

Figure 4D:
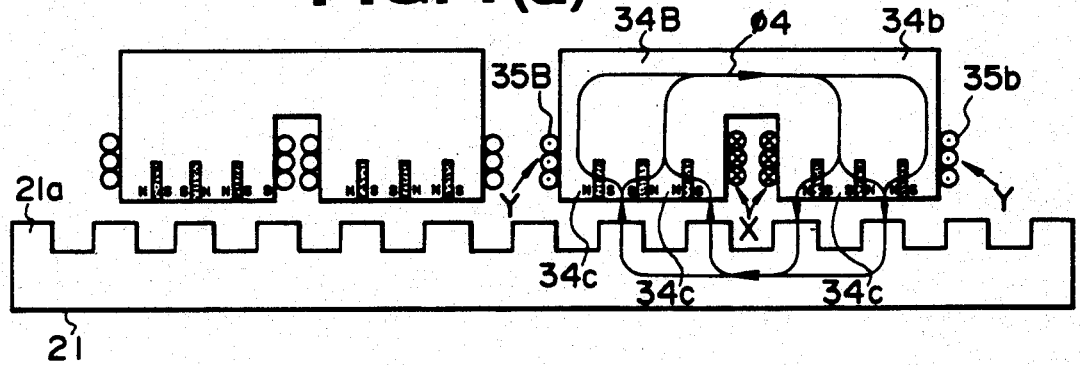

In FIG. 4(d), the pulse current flows from point X to point Y corresponding to coils 35B and 35b in the opposite direction with respect to the direction shown in FIG. 4(b). This constitutes magnetic flux loop $\phi_4$. The same result can be achieved as in the above operation.

Accordingly, by supplying the pulse current to the coils in the order of the parts seen in FIG. 4(a), FIG. 4(b), FIG. 4(c), FIG. 4(d), and FIG. 4(a), primary magnetic member 22 travels along secondary magnetic member 21, by means of a distance P, toward the left in the drawing. On the other hand, by supplying the pulse current to the coils in the order of FIG. 4(d), FIG. 4(c), FIG. 4(b), FIG. 4(a), and FIG. 4(d), primary magnetic member 22 travels along secondary magnetic member 21 by means of a distance P, toward the right. In other words, by changing the direction of the pulse current from A-phase block 23 to B-phase block 33, or vice versa, primary magnetic member 22 travels along secondary magnetic member 21 by means of a distance P/4 in either direction depending upon the direction of current flow.

Figure 5:
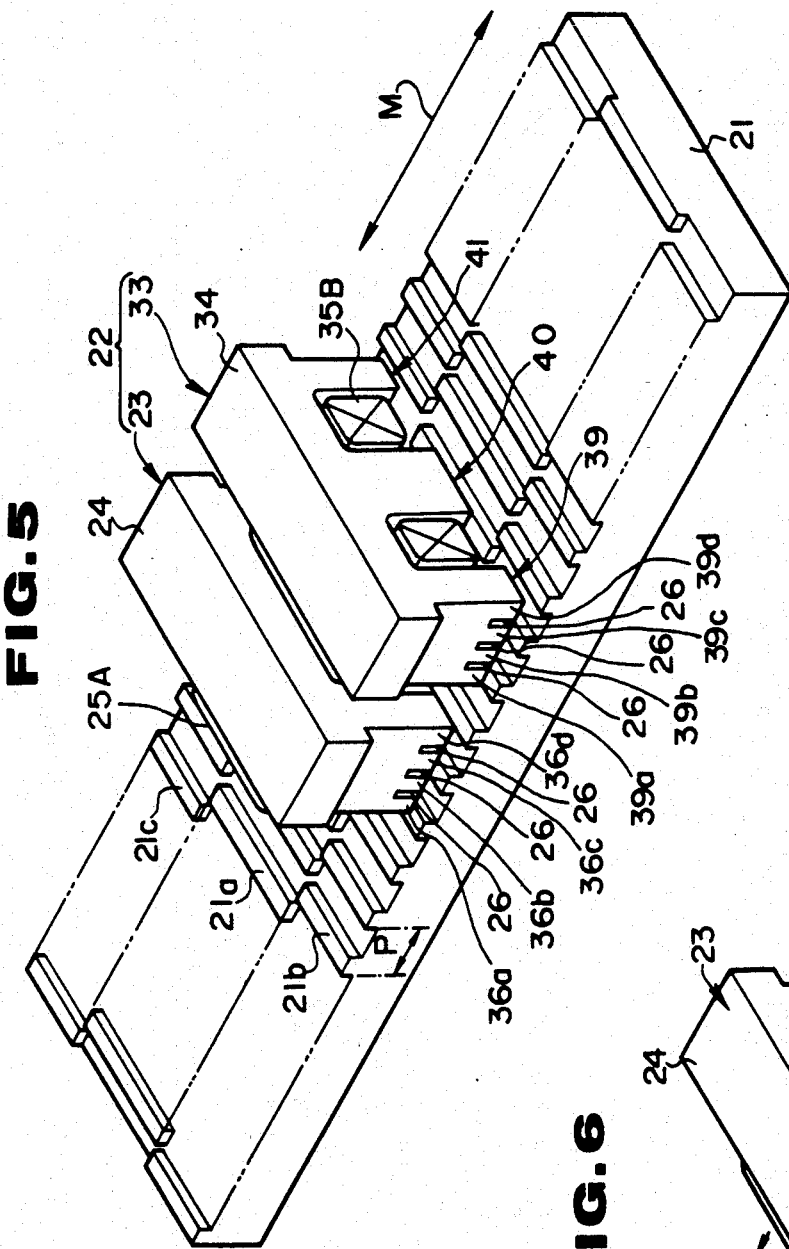
FIG. 5 is a perspective view showing a linear pulse motor constructed in accordance with a second embodiment of the present invention.

FIG. 5 shows a second embodiment of the invention. This linear pulse motor has a different type of primary magnetic member 22 and secondary magnetic member 21 as compared with those of the first embodiment.

Upon the upper side of secondary magnetic member 21, three rows of rectangular teeth 21b, 21a, and 21c are formed so as to be disposed within an array which extends parallel to the longitudinal direction, and the longitudinal axis of each respective rectangular tooth 21b, 21a, and 21c is oriented in a direction transverse to the longitudinal direction. Each of the rectangular teeth 21b, 21a, and 21c is formed at a constant pitch, at a distance of P, in the longitudinal direction. In addition, the position of the rectangular teeth 21a within the middle row is shifted by means of a distance of P/2 with respect to that of the rectangular teeth 21b and 21c disposed within their respective rows.

Primary magnetic member 22 comprises A-phase block 23 and B-phase block 34, both of which are connected by a connecting means.

Figure 6:
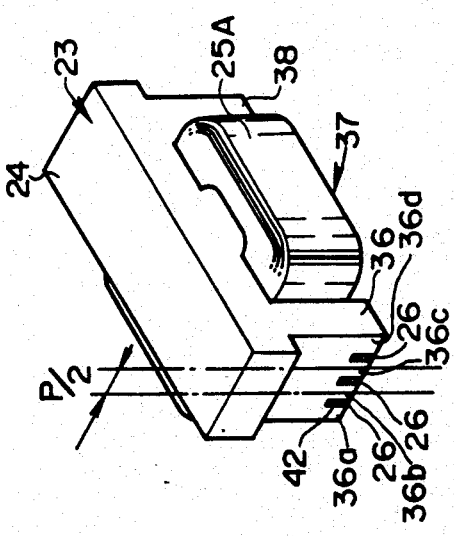
FIG. 6 is a perspective view showing the details of A-phase block 23 of FIG. 5.

FIG. 6 shows the details of A-phase block 23. A-phase block 23 comprises an E-shaped core 24 having three projecting portions 36, 37, and 38; each end surface of the projecting portions 36, 37, and 38 is disposed toward respective rectangular teeth 21b, 21a, and 21c, and each end surface of the projecting portions 36, 37, and 38 has grooves 42 extending in a direction transverse to each end surface thereof; a permanent magnet 26 inserted into the respective grooves 42 so that each of the adjacent permanent magnets 26 is of an opposite polarity; and A-phase coil 25A wound around the middle projecting portion 37. Accordingly, the middle projecting portion 37 has magnetic poles 37a, 37b, 37c, and 37d for the +A-phase, which are sectioned by means of permanent magnets 26 so that magnetic poles 37a, 37b, 37c, and 37d are formed at a constant pitch, at a distance of P/2, in the longitudinal direction, these magnetic poles not being shown in FIG. 6, but are described later by means of reference to FIG. 7. Similarly, projecting portion 36 has magnetic poles 36a, 36b, 36c, and 36d for the −A-phase, which are formed at a constant pitch at a distance which is the same as that of the above construction, while projecting portion 38 has magnetic poles 38a, 38b, 38c, and 38d for the −A-phase, which are formed at a constant pitch as well, in the longitudinal direction.

Figure 7:
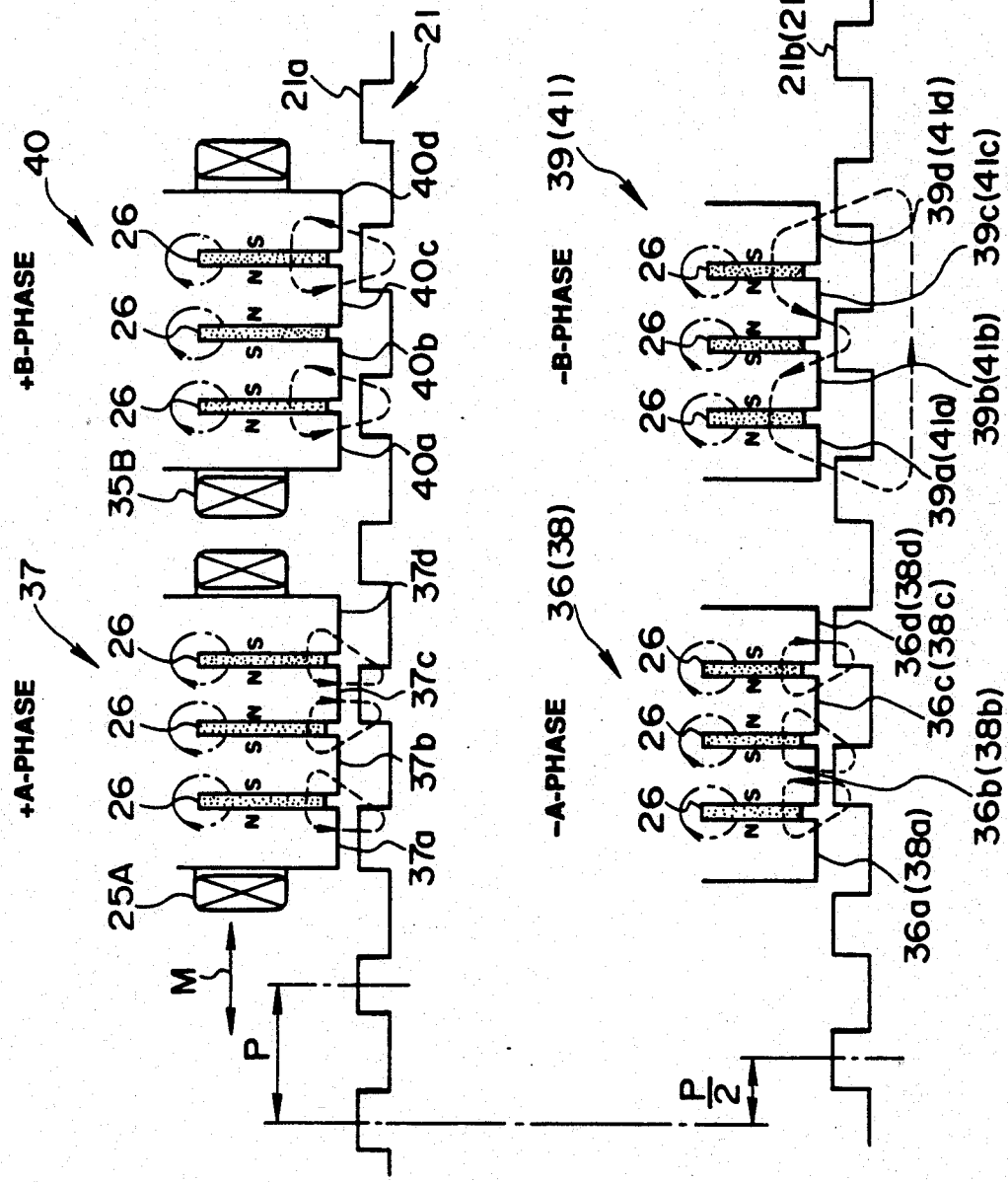
FIG. 7 is a side view showing the operation of the linear pulse motor when the coils are not energized.

In such a case, when magnetic poles 37a, 37b, 37c, and 37d are disposed directly above rectangular teeth 21a, both groups of magnetic poles 36a, 36b, 36c, and 36d, and magnetic poles 38a, 38b, 38c, and 39d, are shifted by means of a distance of P/2 with respect to rectangular teeth 21a, as shown in FIG. 7. FIG. 7 is more fully described later.

On the other hand, B-phase block 33 is of a similar construction as that of A-phase block 23. B-phase block 33 is therefore described briefly. B-phase block 33 comprises an E-shaped core 34 having three projecting portions 39, 40, and 41, and these are disposed toward respective rectangular teeth 21b, 21a, and 21c, and have grooves 42, permanent magnets 26 being inserted into respective grooves 42, and B-phase coil 35B being wound around the middle projection portion 40. Accordingly, the middle projection portion 40 has magnetic poles 40a, 40b, 40c, and 40d for the +B-phase, projecting portion 39 has magnetic poles 39a, 39b, 39c and 39d for the −B-phase, and projecting portion 41 has magnetic poles 41a, 41b, 41c, and 41d for the −B-phase. Similarly, when magnetic poles 40a, 40b, 40c, and 40d are disposed directly above rectangular teeth 21a, both groups of magnetic poles 39a, 39b, 39c, and 39d, and magnetic poles 41a, 41b, 41c, and 41d are shifted by means of a distance of P/2 with respect to rectangular teeth 21a.

According to the above construction, A-phase block 23 and B-phase block 33 are connected by a connecting means so that B-phase block 33 is shifted by means of a distance of P/4 with respect to A-phase block 23.

FIG. 7 shows the state wherein A-phase block 23 and B-phase block 33 are stationary with respect to secondary magnetic member 21, that is, both A-phase coil 25A and B-phase coil 35B are not energized at this time. In this case, most of the magnetic flux produced by means of permanent magnets 26 circulates within A-phase block 23 and B-phase block 33 as shown by means of the direction of the arrows having dotted lines, and a small amount of the magnetic flux circulates from A-phase block 23 and B-phase block 33 to rectangular teeth 21a, 21b, and 21c as shown by means of the direction of the other arrows having dashed lines.

The operation is described by means of reference to FIG. 8(a) to FIG. 8(d), in the case where the pulse current is supplied to either A-phase coil 25A or B-phase coil 35B so as to move A-phase block 23 and B-phase block 33 along secondary magnetic member 21 by means of the one-phase exciting system.

Figure 8:
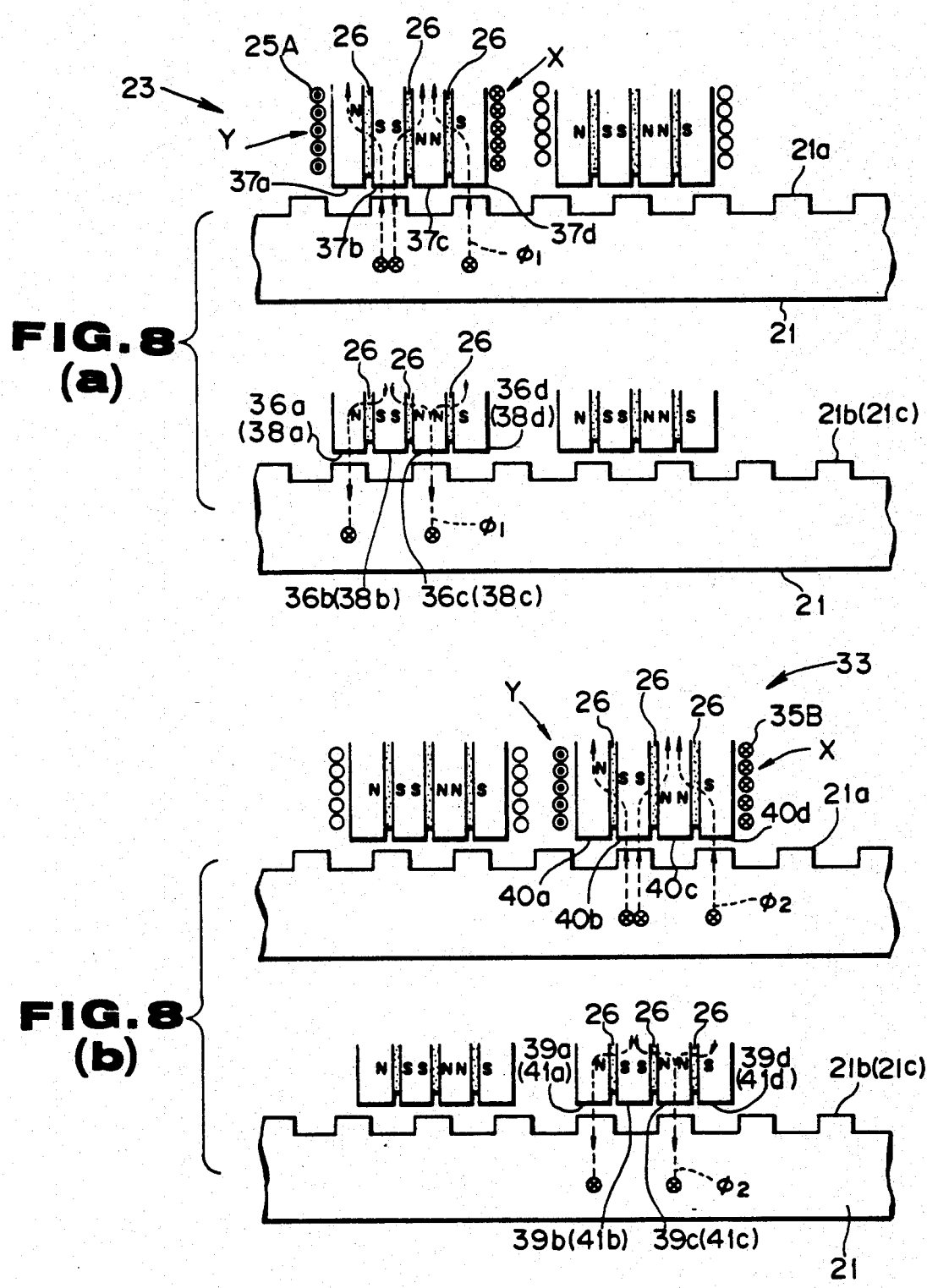
FIG. 8(a) to FIG. 8(d) are side views showing the operation of the linear pulse motor when either coil is energized in accordance with various different modes.
Figure 8:
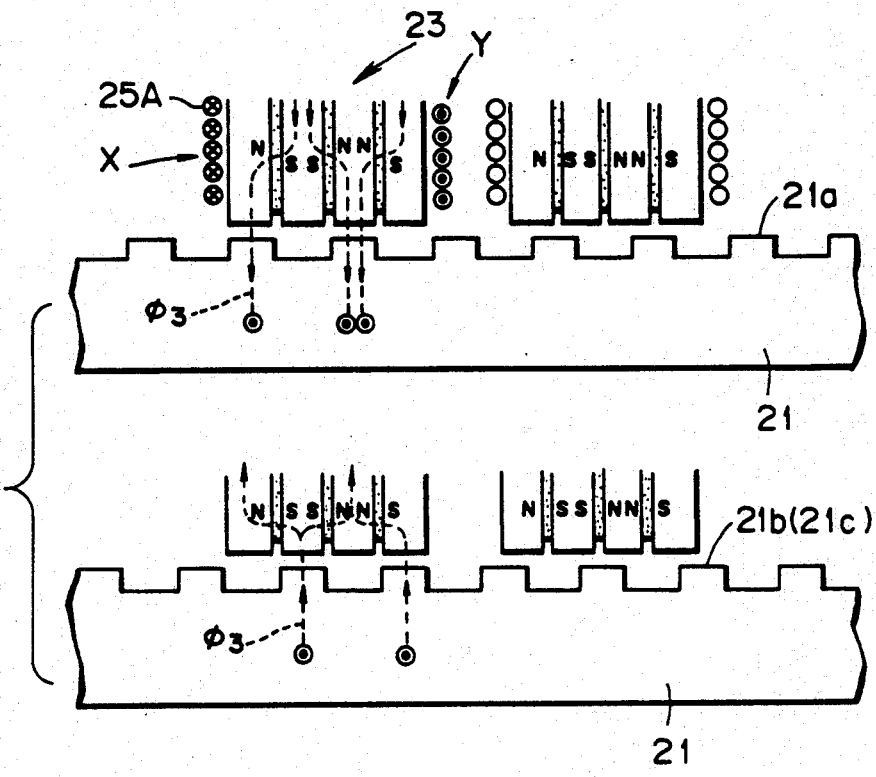
Figure 8:
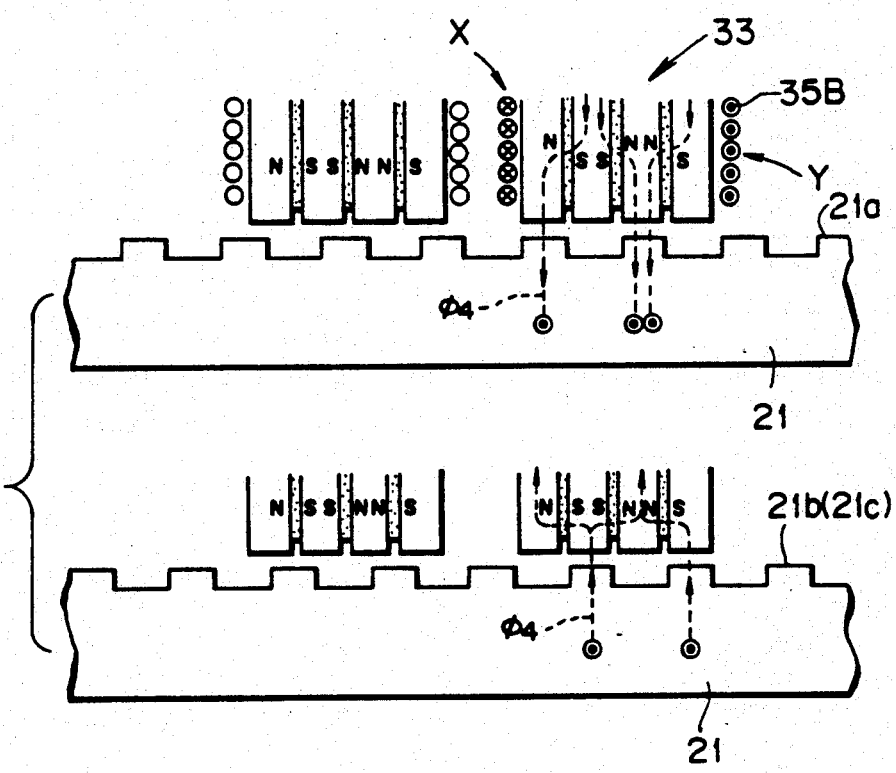

FIG. 8)a) shows that magnetic poles 37a, 37b, 37c, and 37d are formed by projecting portion 37. In FIG. 8(a), the pulse current flows from point X to point Y corresponding to A-phase coil 25A. This causes a magnetomotive force within magnetic poles 37a, 37b, 37c, and 37d to generate a magnetic flux from magnetic poles 37a, 37b, 37c, and 37d for the +A-phase to both groups of magnetic poles 36a, 36b, 36c, and 36d, and magnetic poles 38a, 38b, 38c, and 38d, for the −A-phase. This magnetic flux is circulated from A-phase37b block 23 through secondary magnetic member 21. The magnetic flux coming from rectangular teeth 21a flows into magnetic poles 37a and 37c, and also into magnetic poles 36(a) (38a) and 36c (38c) while magnetic poles 37 and 37c, and magnetic poles 36b (38b) and 36d (38d) do not interact with secondary magnetic members 21. Accordingly, the magnetic flux flows from rectangular teeth 21a to magnetic poles 37b and 37d, and also flows into the adjacent magnetic poles 37a and 37c through means of permanent magnets 26. This constitutes magnetic flux loop $\phi_1$ which flows from magnetic poles 36a(38a) and 36c(38c) to rectangular teeth 21b(21c). As a result, when magnetic poles 37b and 37d are disposed directly above rectangular teeth 21a, and magnetic poles 36a(38a) and 36c(38c) are disposed directly above rectangular teeth 21b(21c), all magnetic poles can contribute to the production 38cof the magnetic thrust.

In FIG. 8(b), the pulse current flows from point X to point Y corresponding to B-phase coil 35B. This constitutes magnetic flux loop $\phi_2$ in accordance with the similar generation of the magnetic flux which has already been described above. As a result, when magnetic poles 40b and 40d are disposed directly above rectangular teeth 21a, and magnetic poles 39a(41a) and 39c(41c) are disposed directly above rectangular teeth 21b(21c), all magnetic poles can contribute to the production of the magnetic thrust.

In FIG. 8(c), the pulse current flows within A-phase coil 25A in the opposite direction with respect to the direction shown in FIG. 8(a). This constitutes magnetic flux loop $\phi_3$. As a result, when magnetic poles 37a and 37c are disposed directly above rectangular teeth 21a, and magnetic poles 36b(38b) and 36d(38d) are disposed directly above rectangular teeth 21b(21c), all magnetic poles can contribute to the production of the magnetic thrust.

Similarly, within FIG. 8(d), the pulse current flows in B-phase coil 35B in the opposite direction with respect to the direction shown in FIG. 8(b). This constitutes magnetic flux loop $\phi_4$. As a result, when magnetic poles 40a and 40c are disposed directly above rectangular teeth 21a, and magnetic poles 39b(41b) and 39d(41d) are disposed directly above rectangular teeth 21b(21c), all magnetic poles can contribute to the production of the magnetic thrust.

Accordingly, by supplying the pulse current to the coils in the order of the parts shown in FIG. 8(a), FIG. 8(b), FIG. 8(c), FIG. 8(d), and FIG. 8(a), primary magnetic member 22 travels along secondary magnetic member 21 through means of a distance P toward the right as seen in the drawings, while supplying the pulse current to the coils in the order of the parts shown in FIG. 8(d), FIG. 8(c), FIG. 8(b), FIG. 8(a) and FIG. 8(d), primary magnetic member 22 is caused to travel along secondary magnetic member 21 through means of a distance of P toward the left as seen in the drawings.

Assuming that primary magnetic member 22 travels along secondary magnetic member 21 by means of a two-phase exciting system, the pause current is supplied as shown in FIG. 9(a) through FIG. 9(d). That is, the pulse current flows from point X to point Y corresponding to A-phase coil 25A and B-phase coil 35B in the order of FIG. 9(a), FIG. 9(b), FIG. 9(c), and FIG. 9(d), and vice versa. In this case, the magnetic flux is simultaneously circulated within A-phase block 23 and B-phase block 33 through means of secondary magnetic member 21 so as to produce a magnetic thrust, so that all magnetic poles can contribute to the production of the magnetic thrust.

Figure 10:
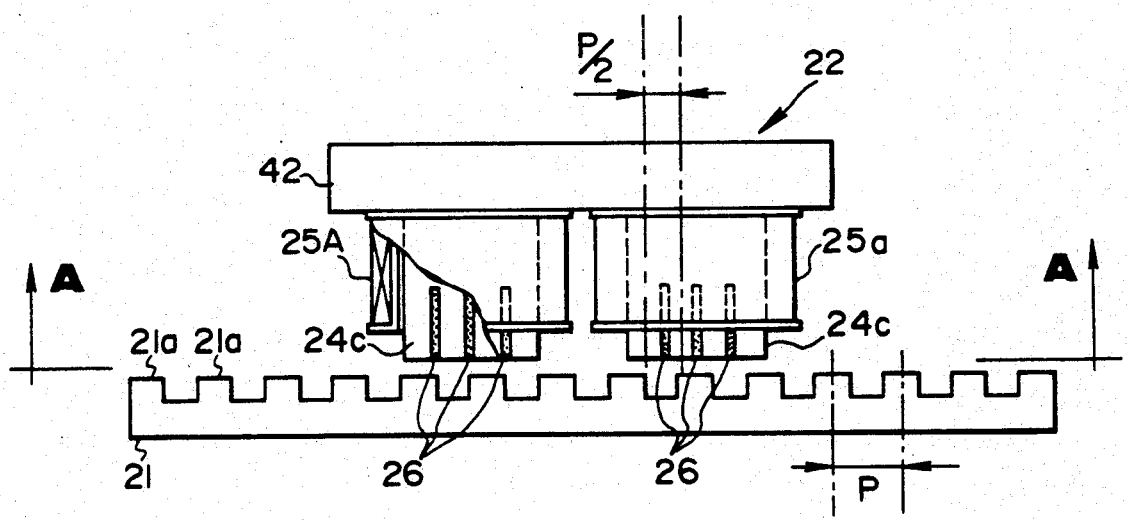
FIG. 10 is a side view showing a linear pulse motor constructed in accordance with a third embodiment of the present invention.
Figure 11:
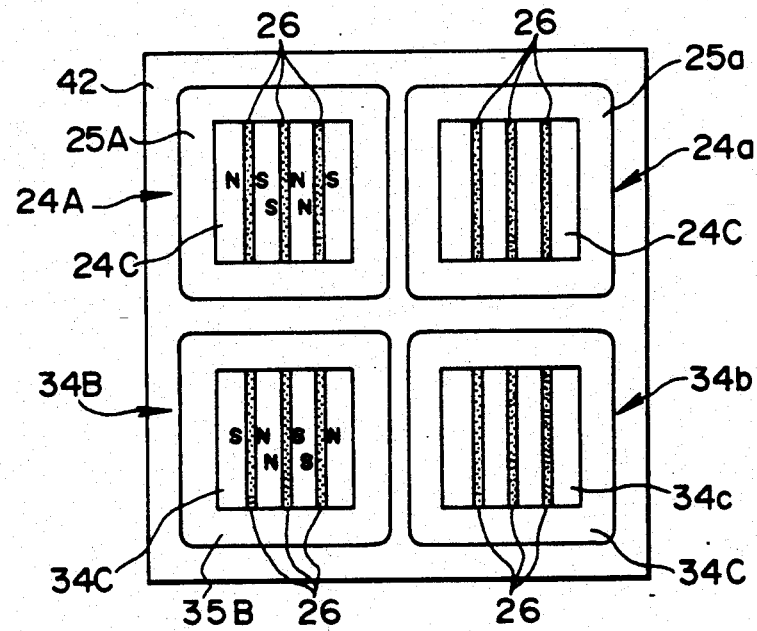
FIG. 11 is a plan view taken in the direction of arrows 11—11 in FIG. 10.

FIG. 10 and FIG. 11 show a third embodiment of the invention. This primary magnetic member 22 comprised a solid core 42, which is comprised of a rectangular solid type +A-phase magnetic pole 24a having rectangular teeth 24C, and −A-phase magnetic pole 24a having rectangular teeth 24C, +B-phase magnetic pole 34B having rectangular teeth 34C, and −B-phase magnetic pole 34b having rectangular teeth 34C, these rectangular teeth 24C and 34C being formed at a constant pitch, at a distance of P/2, in the longitudinal direction, respectively. The +A-phase magnetic pole 24A, −A-phase magnetic pole 24a, +B-phase magnetic pole 34B, and −B-phase magnetic pole 34b, are arranged within a square array with one block being placed at each corner of the square, and disposed so as to extend perpendicularly from core 42, each end surface of these magnetic poles being disposed toward rectangular teeth 21a of secondary magnetic member 21. In addition, permanent magnets 26 are inserted into grooves formed between respective rectangular teeth 24C and 34C and extending in the direction transverse to the longitudinal direction so that each of the adjacent permanent magnets 26 is of an opposite polarity. Coils 25A, 25a, 35B, and 35b are then wound around +A-phase magnetic pole 24A, −A-phase magnetic pole 24a, +B-phase magnetic pole 34B, and −B-phase magnetic pole 34b, respectively. Accordingly, primary magnetic member 22 has two groups, +A-phase magnetic pole 24a and −A-phase magnetic pole 24a for one group; and +B-phase magnetic pole 34B and −B-phase magnetic pole 34b for the other group.

Figure 12:
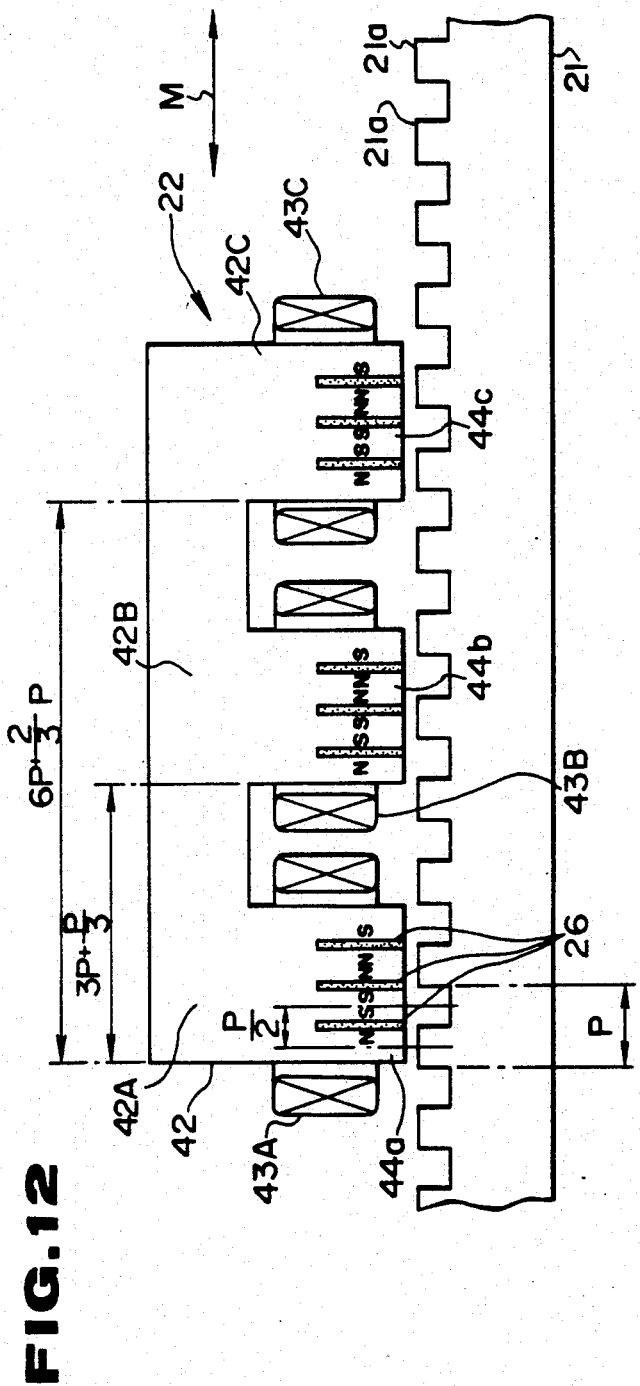
FIG. 12 is a side view showing a linear pulse motor constructed in accordance with a fourth embodiment of the present invention.

FIG. 12 shows a fourth embodiment of the invention. This linear pulse motor is of the three-phase type. This primary magnetic member 22 is composed of a core 42 having A-phase magnetic pole 42A wound by means of coil 43A, B-phase magnetic pole 42B wound by means of coil 43B, and C-phase magnetic pole 42C wound by means of coil 43C, in the longitudinal direction. A-phase magnetic pole 42A, B-phase magnetic pole 42B, and C-phase magnetic pole 42C have rectangular teeth 44a, 44b, and 44c formed in the direction transverse to the longitudinal direction, respectively. Permanent magnets 26 are also inserted into grooves in a manner similar to that of the previous embodiments.

Assuming that a reference line is set at the left edge of A-phase magnetic pole 42A, the left edge of B-phase magnetic pole 42B is positioned at a distance of 3P+P/3 with respect to the reference line. The left edge of C-phase magnetic pole 42C is positioned at a distance of 6P+2/3P with respect to the reference line. In other words, when rectangular teeth 44a are disposed directly above rectangular teeth 21a, rectangular teeth 44b are shifted by means of a distance of P/3 with respect to rectangular teeth 21a, and rectangular teeth 44c are shifted by means of a distance of 2×P/3 with respect to rectangular teeth 21a.

Secondary magnetic member 21 has rectangular teeth 21a similar to those of the first embodiment as shown in FIG. 3.

Figure 13:
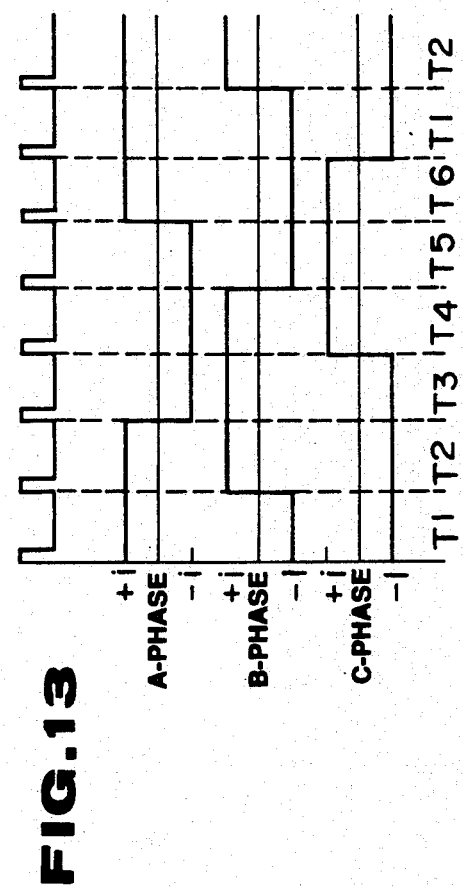
FIG. 13 is a time chart showing the wave forms of a pulse current as supplied to the coils of the pulse motor.
Figure 14:
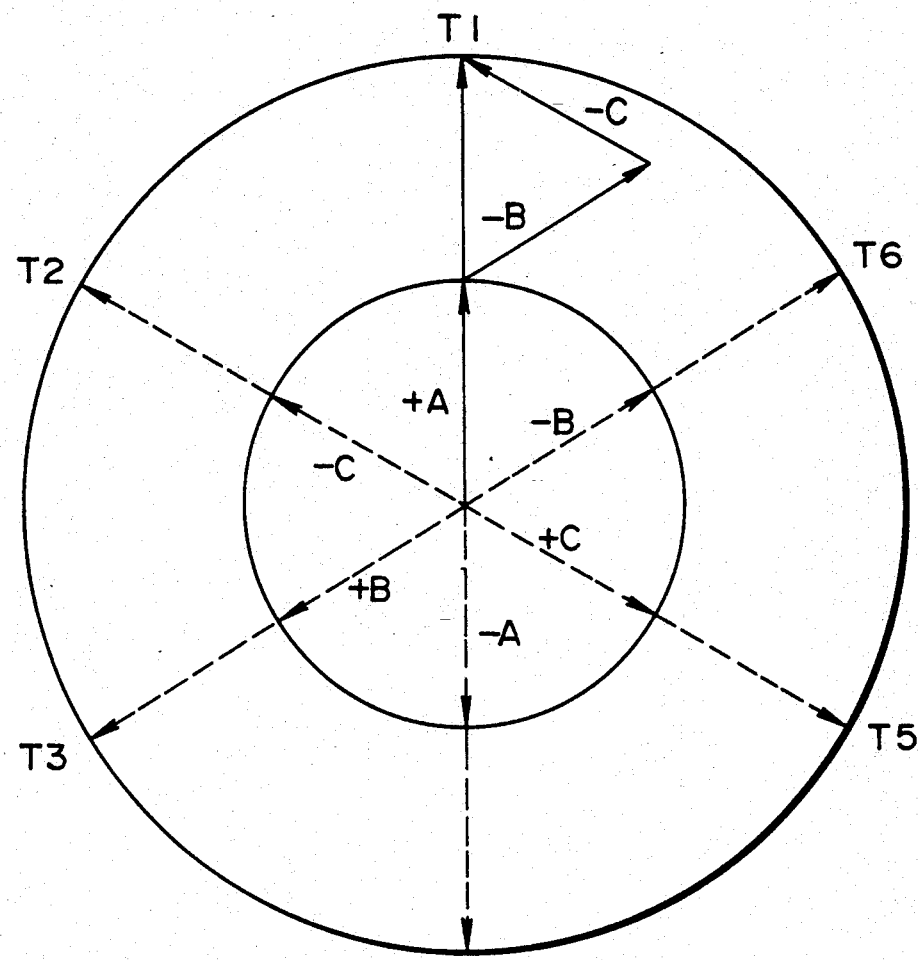
FIG. 14 is a thrust developed between the poles of the primary magnetic member and the teeth of the secondary magnetic member of the motor of FIG. 12 vector chart showing the magnetic thrust.

The operation of this embodiment is described based upon reference being made to FIGS. 13 and 14. When the pulse current is supplied to coil 43A for the A-phase, coil 43B for the B-phase, and coil 43C for the C-phase, the polarity combination of magnetic poles 42A, 42B, and 42C is inverted at every reference pulse having constant time intervals T1 to T6 as shown in FIG. 13. That is, this linear pulse motor is operated by means of a bipolar driving system which means two of the three-phases achieve a positive state at every other reference pulse.

FIG. 14 is a thrust vector diagram for illustrating the magnetic thrust which is generated between magnetic poles 42A, 42B, and 42C, and rectangular teeth 21a, respectively. In this diagram, the term of "+A" represents a thrust vector produced by supplying a pulse current to coil 43A for the A-phase in the positive direction, and the term "−A" represents a thrust vector produced by supplying a pulse current to coil 43A in the negative direction. Similarly, the terms "+B" and "+C" represent respective thrust vectors produced by supplying the pulse current to coil 43B for the B-phase and coil 43C for the C-phase in the positive direction, respectively. The terms "−B" and "−C" represent respective thrust vectors caused by supplying the pulse current to coil 43B and coil 43C in the negative direction, respectively. Accordingly, FIG. 14 shows a thrust vector in the case that the pulse current is supplied to coil 43A for the A-phase in the positive direction, and supplied to coil 43B for the B-phase in the negative direction, and also supplied to coil 43C for the C-phase in the negative direction during the time interval T1 as shown in FIG. 13, so that a magnetic thrust is composed of thrust vector +A, thrust vector −B, and thrust vector −C for acting between primary magnetic member 22 and secondary magnetic member 21. Afterward, the pulse current is supplied to respective coils 43A, 43B, and 43C in the order of time intervals T2, T3, T4, T5, and T6, which changes the thrust vector in the order of T2, T3, T4, T5, and T6 as shown in FIG. 14. Thus, when the thrust vector changes in the order of T1, T2, T3, T4, T5, and T6, the primary magnetic member 22 travels along secondary magnetic member 21 in one direction, while if the thrust vector changes in the order of T6, T5, T4, T3, T2 and T1, primary magnetic member 22 travels along secondary magnetic member 21 in the other direction.

Figure 15:
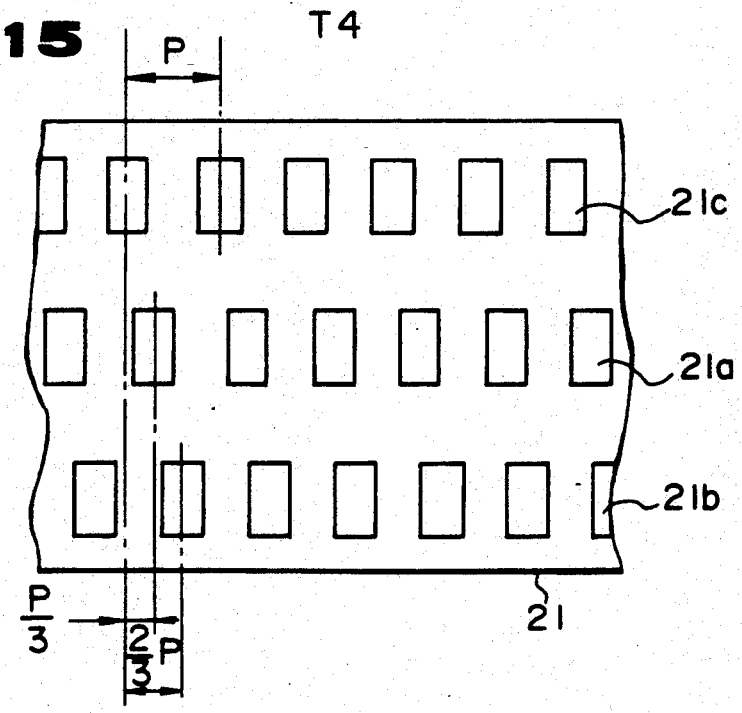
FIG. 15 is a plan view showing the secondary magnetic member of a pulse motor constructed in accordance with a first embodiment of the present invention.
Figure 16:
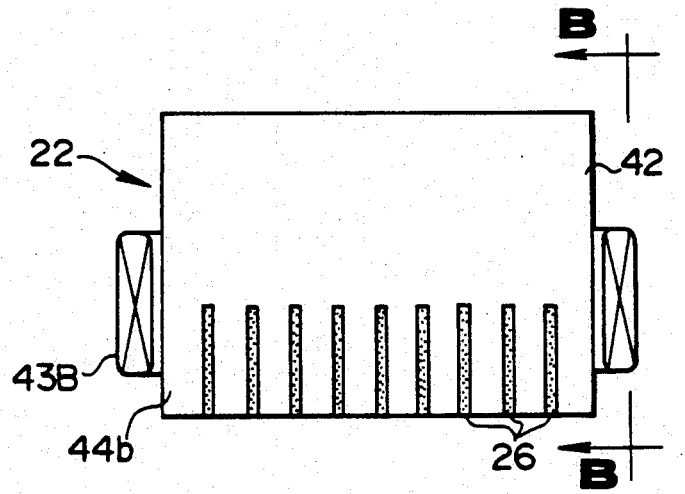
FIG. 16 is a side view showing the primary magnetic member of the motor of the fifth embodiment of the present invention.
Figure 17:
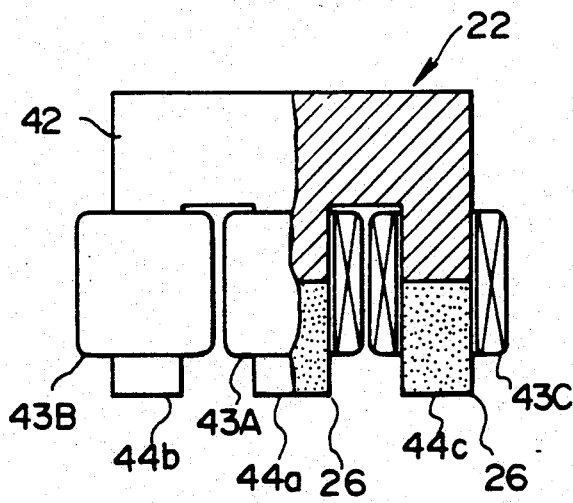
FIG. 17 is a side view, partially cut away, of the primary magnetic member shown in FIG. 16 and taken in the direction of the arrows 17—17 in FIG. 16.

FIGS. 15, 16, and 17 show a fifth embodiment of the invention. In this case, three rows of rectangular teeth 21a, 21b, and 21c are formed upon secondary magnetic member 21 in the longitudinal direction. Each of the rectangular teeth 21a, 21b, and 21c is formed at constant spaced intervals in a direction transverse to the longitudinal direction, and also at a constant pitch, at a distance of P, in the longitudinal direction. In addition, each position of the rectangular teeth 21a is shifted by means of a distance of P/3 with respect to that of rectangular teeth 21c, and each position of the rectangular teeth 21b is shifted by means of a distance of P/3 with respect to that of rectangular teeth 21a.

Primary magnetic member 22 is of a construction similar to that which has been described in the fourth embodiment. That is, rectangular teeth 44a, rectangular teeth 44b, and rectangular teeth 44c are disposed toward rectangular teeth 21a, rectangular teeth 21b, and rectangular teeth 21c in a direction transverse to the longitudinal direction, respectively. The remaining structure of primary magnetic member 22 is identical with that of member 22 of the fourth embodiment.

Figure 18:
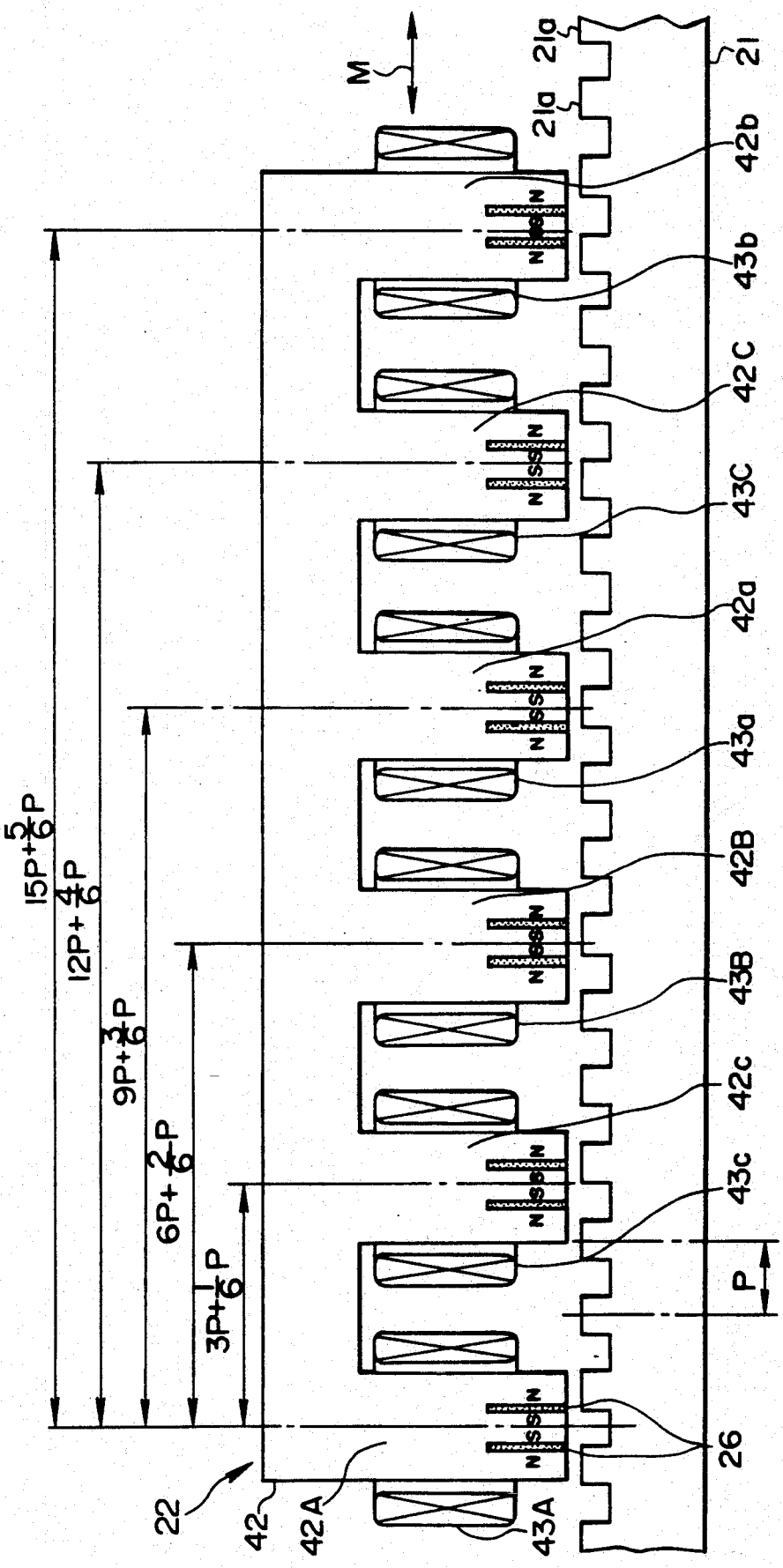
FIG. 18 is a side view showing a linear pulse motor constructed in accordance with a sixth embodiment of the present invention.

FIG. 18 shows a sixth embodiment of the invention. In this embodiment, secondary magnetic member 21 is of a construction similar to that described in the fourth embodiment, therefore, primary magnetic member 22 is only described in this embodiment. This primary magnetic member 22 is composed of core 42 having six magnetic poles in the longitudinal direction and comprising the order of +A-phase magnetic pole 42A wound coil 43A, −C-phase magnetic pole 42c wound coil 43c, +B-phase magnetic pole 42B wound coil 43B, −A-phase magnetic pole 42a wound coil 43, +C-phase magnetic pole 42C wound coil 43C, and −B-phase magnetic pole 42b wound coil 43b, these magnetic poles being arranged from the left to the right as seen in the drawing. In addition, two permanent magnets 26 are inserted into grooves of the respective magnetic poles. In accordance with such a construction of primary magnetic member 22, −C-phase magnetic pole 42c is positioned at a distance of 3P+(1/6)P with respect to the reference line which comprises a vertical center line of +A-phase magnetic pole 42A. +B-phase magnetic pole 42B is positioned at a distance of 6P+(2/6)P, −A-phase magnetic pole 42a is positioned at a distance of 9P+(3/6)P, +C-phase magnetic pole 42C is positioned at a distance of 12P+(4/6)P, and −B-phase pole 42b is positioned at a distance of 15P+(5/6)P, with respect to the reference line, respectively.

Figure 19:
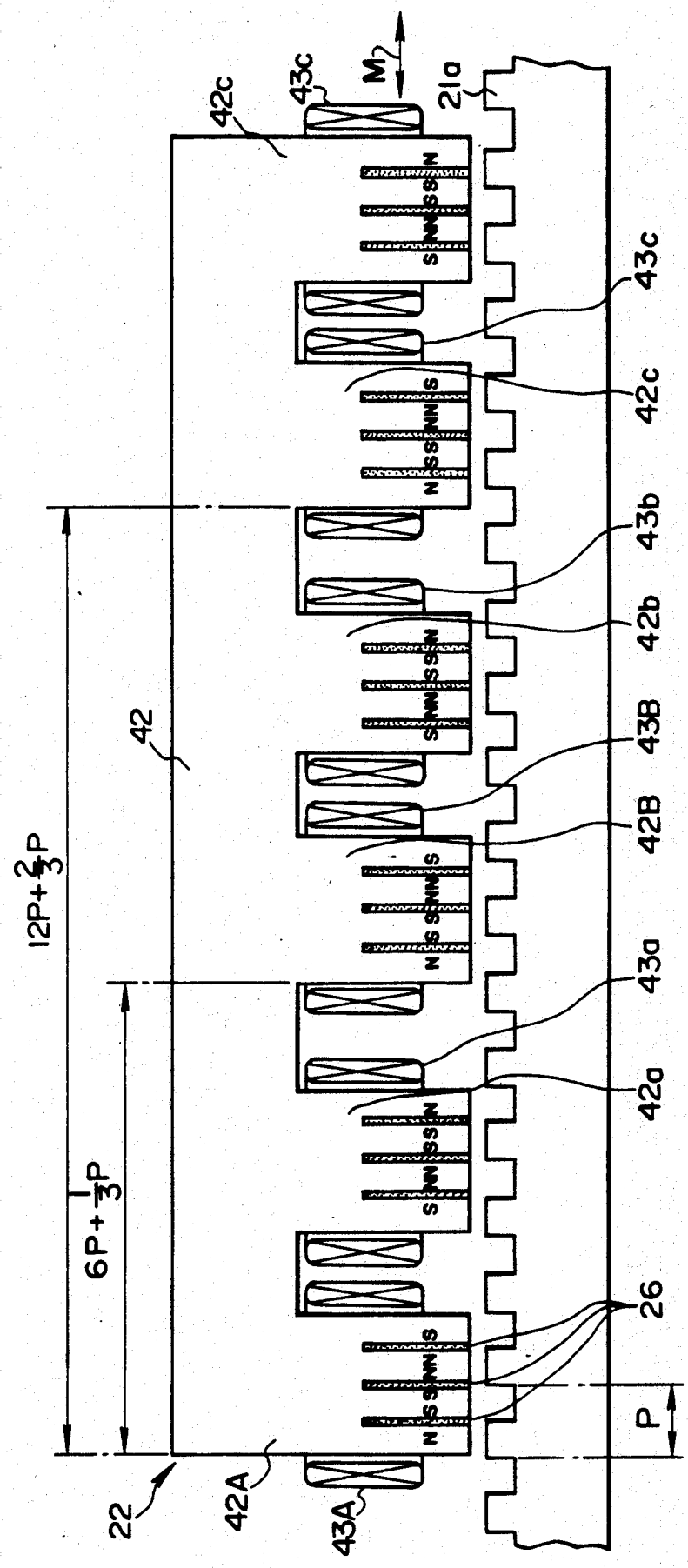
FIG. 19 is a side view showing a linear pulse motor constructed in accordance with a seventh embodiment of the present invention.

FIG. 19 shows a seventh embodiment of the invention. This primary magnetic member 22 has a construction similar to that of the sixth embodiment as shown in FIG. 18. The only difference resides in the orderly arrangement of the poles, and more particularly, it is seen that in accordance with this embodiment, the magnetic pole arrangement is in the order of +A-phase magnetic pole 42A, −A-phase magnetic pole 42a, +B-phase magnetic pole 42B, −B-phase magnetic pole 42b, +C-phase magnetic pole 42C, and −C-phase magnetic pole 42c, the same being arranged from the left to the right as seen in the drawing, and, in addition, three permanent magnets 26 are inserted into grooves for each of the magnetic poles.

According to this construction of primary magnetic member 22, +B-phase magnetic pole 42B is positioned at a distance of 6P+(1/3)P with respect to the reference line, and +C-phase magnetic pole 42C is positioned at a distance of 12P+(2/3)P with respect to the reference line. It is noted that the reference line in this embodiment is illustrated as being at the extreme left edge of pole 42a, and the aforenoted distances between the poles are measured from the reference line to the extreme left edges of each pole 42B and 42C. In addition, the group of +B-phase magnetic pole 42B and −B-phase magnetic pole 42b is shifted by means of a distance of P/3 with respect to the group of +A-phase magnetic pole 42A and −A-phase magnetic pole 42a, and the group of +C-phase magnetic pole 42C and −C-phase magnetic pole 42c is shifted by means of a distance of P/3 with respect to the group of +B-phase magnetic pole 42B and −B-phase magnetic pole 42b.

The operation of this embodiment is similar to that of the first embodiment, the only difference being that this linear pulse motor is operated in a three-phase mode.

Figure 20:
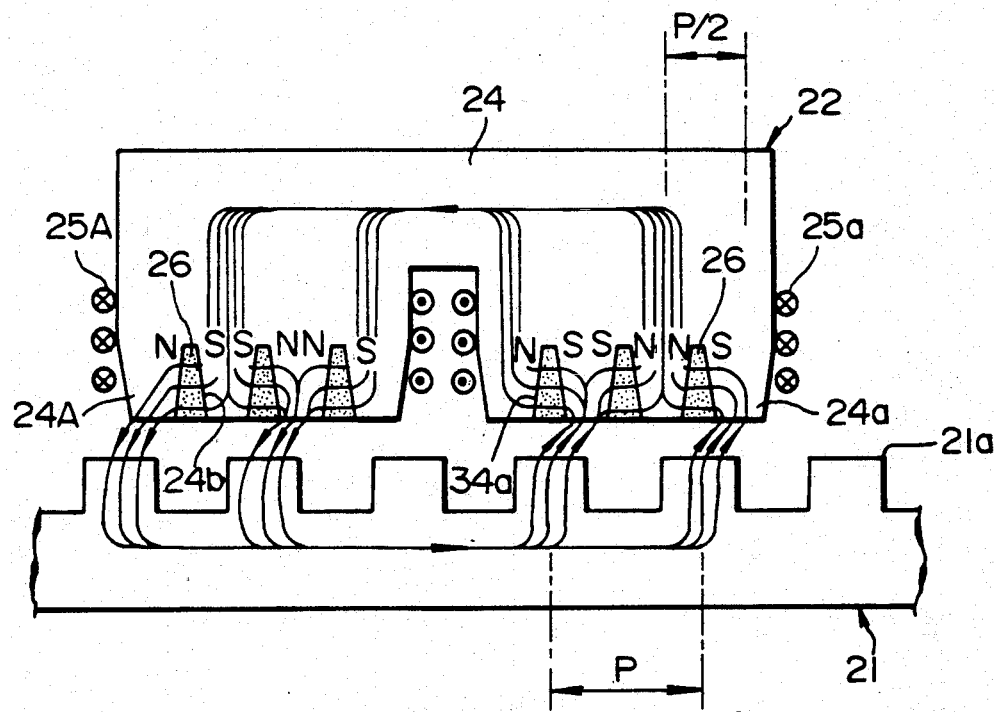
FIG. 20 is a side view showing a linear pulse motor constructed in accordance with an eighth embodiment of the present invention.

FIG. 20 shows an eighth embodiment of the invention. The feature of this embodiment is that permanent magnet 26 is of a wedge-shaped type having shorter and longer sides, both of which are parallel to each other, and also having opposite sides inclined toward each other when viewed in cross section thereof. Primary magnetic member 22 composed of core 24 having +A-phase magnetic pole 24a wound by means of coil 25A, and having +A-phase magnetic pole 24a wound by means of coil 25a. Each +A-phase magnetic pole 24A and −A-phase magnetic pole 24a has a plurality of trough-shaped grooves 24b and 34b, both of which are formed in the direction transverse to the longitudinal direction of primary magnetic member 22. Wedge-shaped permanent magnets 26 are then inserted into respective grooves 24b and 34b so that the shorter and inclined sides of permanent magnetic 26 are disposed in contact with the internal inclined end and walls of grooves 24b and 34b, and the longer side thereof is disposed toward secondary magnetic member 21. Secondary magnetic member 21 has rectangular teeth 21a similar to the construction of the first embodiment. It is also to be noted that the wedge-shaped permanent magnets 26 can be used within all previous embodiments.

In this embodiment, when each +A-phase magnetic pole 24A and −A-phase magnetic pole 24a moves close to rectangular teeth 21a and is disposed directly above rectangular teeth 21a, the magnetic force is strongly exerted between the magnetic poles and rectangular teeth 21a so that leakage flux which does not contribute to the production of the magnetic thrust can be minimalized.

Figure 21:
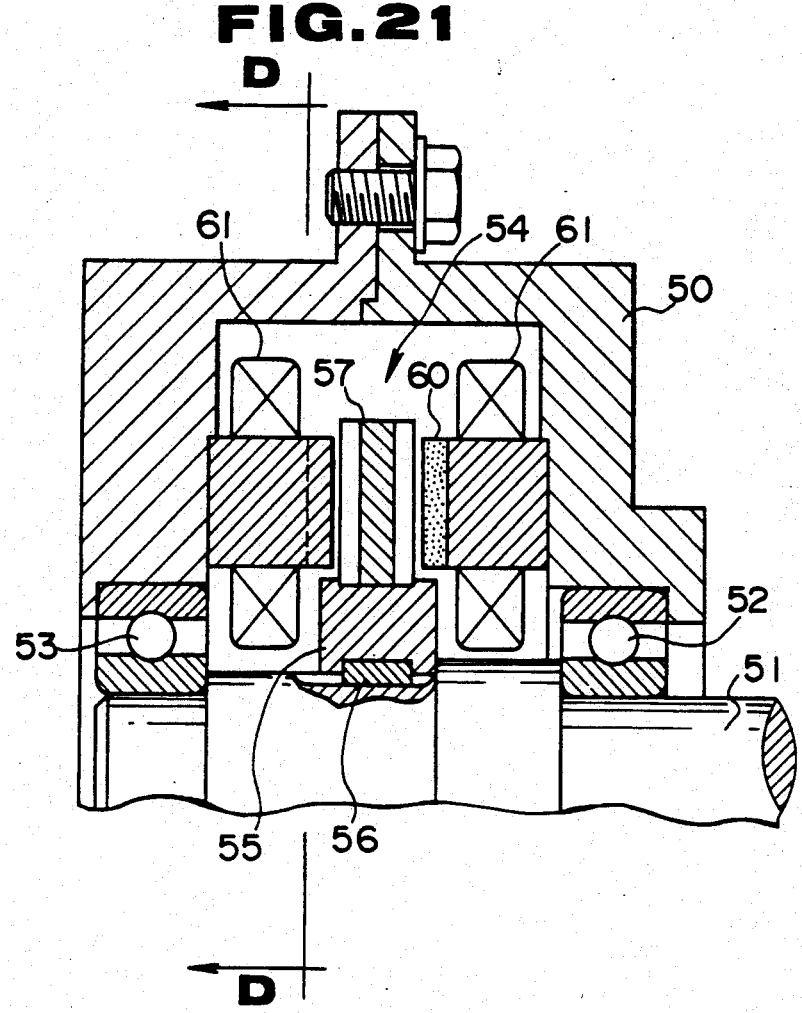
FIG. 21 is a section view, partially cut away, of a disk-rotor type pulse motor constructed in accordance with a ninth embodiment of the present invention.

FIG. 21 shows a ninth embodiment of the invention. This embodiment describes a disk-rotor type pulse motor. In the drawing, numeral 50 designates a housing, a numeral 51 designates a shaft which rotatably supports housing 50 through means of bearings 52 and 53. Within housing 50, shaft 51 has disk-like rotor 54 fixed thereto. This rotor 54 is disposed around the outer peripheral surface of annular member 55, and this annular member 55 is fixed to shaft 51 by means of key 56. In addition, the annular stators 61 are fixed to the inside walls of housing 50 so that both surfaces of rotor 54 face stators 61.

Figure 22:
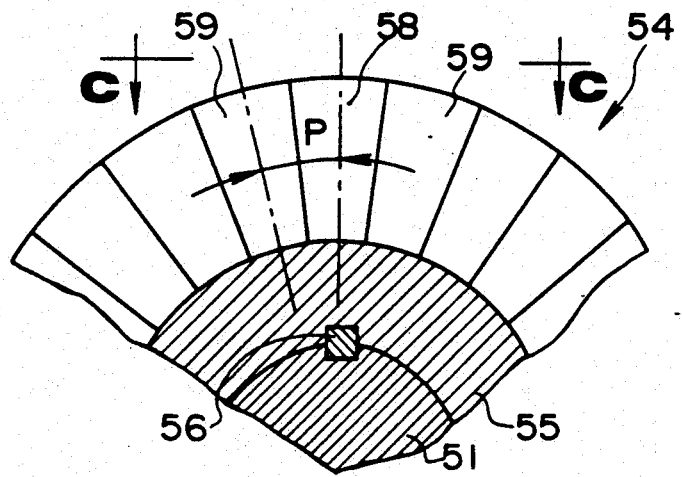
FIG. 22 is an enlarged side view, partially cut away, of the disk-rotor of FIG. 21.

The details of rotor 54 are shown in FIG. 22. Upon both outside lateral surfaces of rotor 54, rectangular teeth 58 and grooves 59 are formed with these alternating at a constant pitch, at a distance of P, along a concentric circle whose radius is midway between the outer arc and inner arc of rectangular teeth 58, wherein each radial axis of each rectangular tooth 58 is intersected at the concentric circle, and the sides of grooves 59 are disposed so as to lie upon a line which defines a radius of rotor 54.

Figure 23:
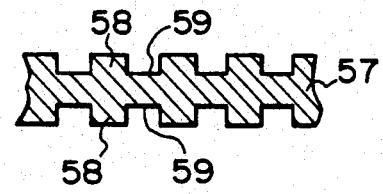
FIG. 23 is a section view taken along the lines 23—23 in FIG. 22.

FIG. 23 shows a sectional view of rotor 54 having rectangular teeth 58 and grooves 59.

Figure 24:
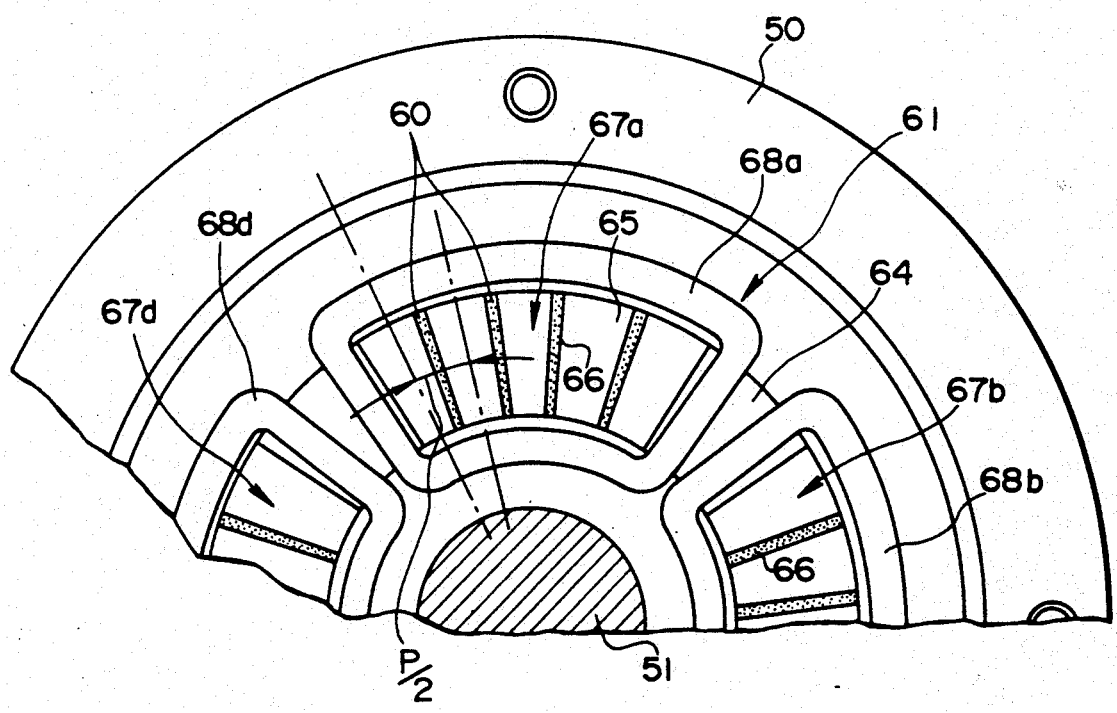
FIG. 24 is an enlarged sectional view, partially cut away, of the stator portion of the motor of FIG. 21 as taken along the lines 24—24 in FIG. 21.

FIG. 24 shows the details of stators 61. Stators 61 comprise an annular type core 64; coils 68a to 68d wound around core 64 at constant intervals so as to form magnetic poles 67a to 67d, these magnetic poles 67a to 67d having segments 65 and grooves 66, formed at a constant pitch, at a distance of P/2, along concentric circle whose radius is midway between the outer arc and inner arc of segments 65, wherein each radial axis of each segment 65 is intersected at the concentric circle; and permanent magnets 60 are inserted into respective grooves 66 so that each of the adjacent permanent magnets 60 is of an opposite polarity, segments 65 being disposed toward rectangular teeth 58 of rotor 54.

Accordingly, when magnetic pole 67a is disposed toward rectangular teeth 58, for example, a magnetic flux flows into segments 65 through means of permanent magnets 60. This causes a magnetic flux to flow into rectangular teeth 58 of rotor 54. As a result, all magnetic poles can contribute to the production of the magnetic thrust. This is a principle similar to that which is described in connection with the first embodiment. In this case, the wedge-shaped permanent magnet which is shown in FIG. 20 can be used in this embodiment.

Figure 25:
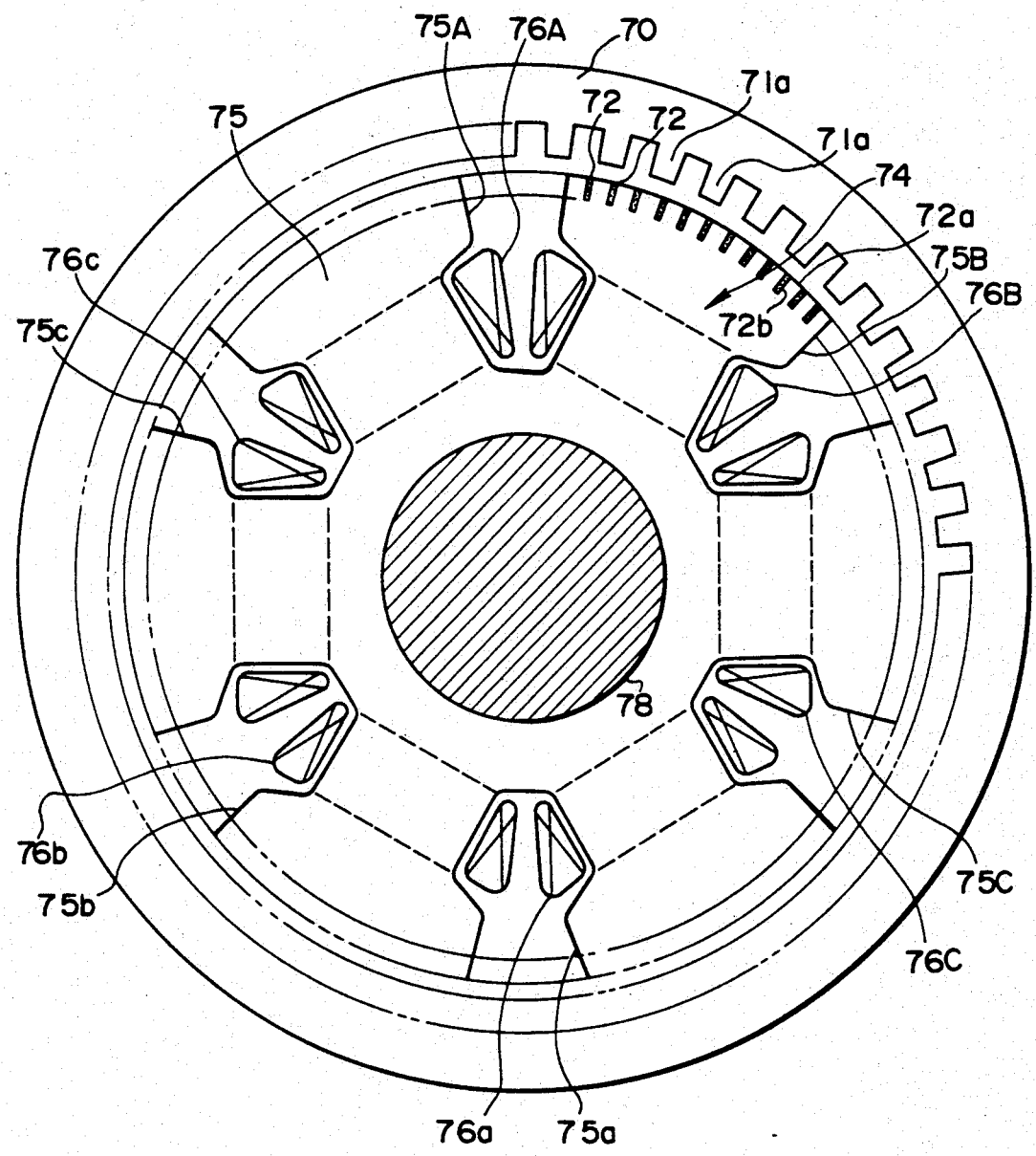
FIG. 25 is a partial view showing an outer-rotor type pulse motor constructed in accordance with a tenth embodiment of the present invention.

FIG. 25 shows a tenth embodiment of the invention. This pulse motor is of an outer-rotor type. In the drawing, numeral 70 designates a cylinder type outer rotor made of a magnetic material, and having rectangular teeth 71 disposed along an inner peripheral surfaces thereof. These rectangular teeth 71 are formed at a constant pitch, at a distance of P, along the inner peripheral surfaces thereof, in which each inner peripheral surface of each rectangular tooth 71a is intersected by means of the radial axis of the respective tooth 71.

Stator 74 comprises a circular type core 75 having rectangular teeth 72a and grooves 72 disposed along an outer peripheral surface portion thereof, these rectangular teeth 72a are formed at a constant pitch, at a distance of P/2, along the outer peripheral surface of stator 74, each outer peripheral surface of each rectangular tooth 72a being intersected by means of each radial axis of the respective rectangular tooth 72a, and further comprises +A-phase magnetic pole 75A, +B-phase magnetic pole 75B, +C-phase magnetic pole 75C, −A-phase magnetic pole 75a, −B-phase magnetic pole 75b, and −C-phase magnetic pole 75c; coils 76A to 76C, and 76a to 76c wound around +A-phase magnetic pole 75A, +B-phase magnetic pole 75B, +C-phase magnetic pole 75C, −A-phase magnetic pole 75a, −B-phase magnetic pole 75b, and −C-phase magnetic pole 75c, respectively; and permanent magnets 72 inserted into grooves 72b so that each of the adjacent permanent magnets 72 is of an opposite polarity. This stator 74 is fixed to shaft 78, and thus outer rotor 70 can rotate around stator 74.

When the magnetic poles formed between permanent magnets 72 are disposed toward rectangular teeth 71a of outer rotor 70, a magnetic flux flows into the magnetic poles formed between permanent magnets 72 from the adjacent magnetic poles through means of permanent magnets 72. This causes a magnetic flux to flow into rectangular teeth 71a of outer rotor 70. As a result, all magnetic poles can contribute to the production of the magnetic thrust such as that developed within the disk-rotor type pulse motor comprising the eighth embodiment. In this case, the wedge-shaped permanent magnets which are shown in FIG. 20 can be used in this embodiment.

Figure 26:
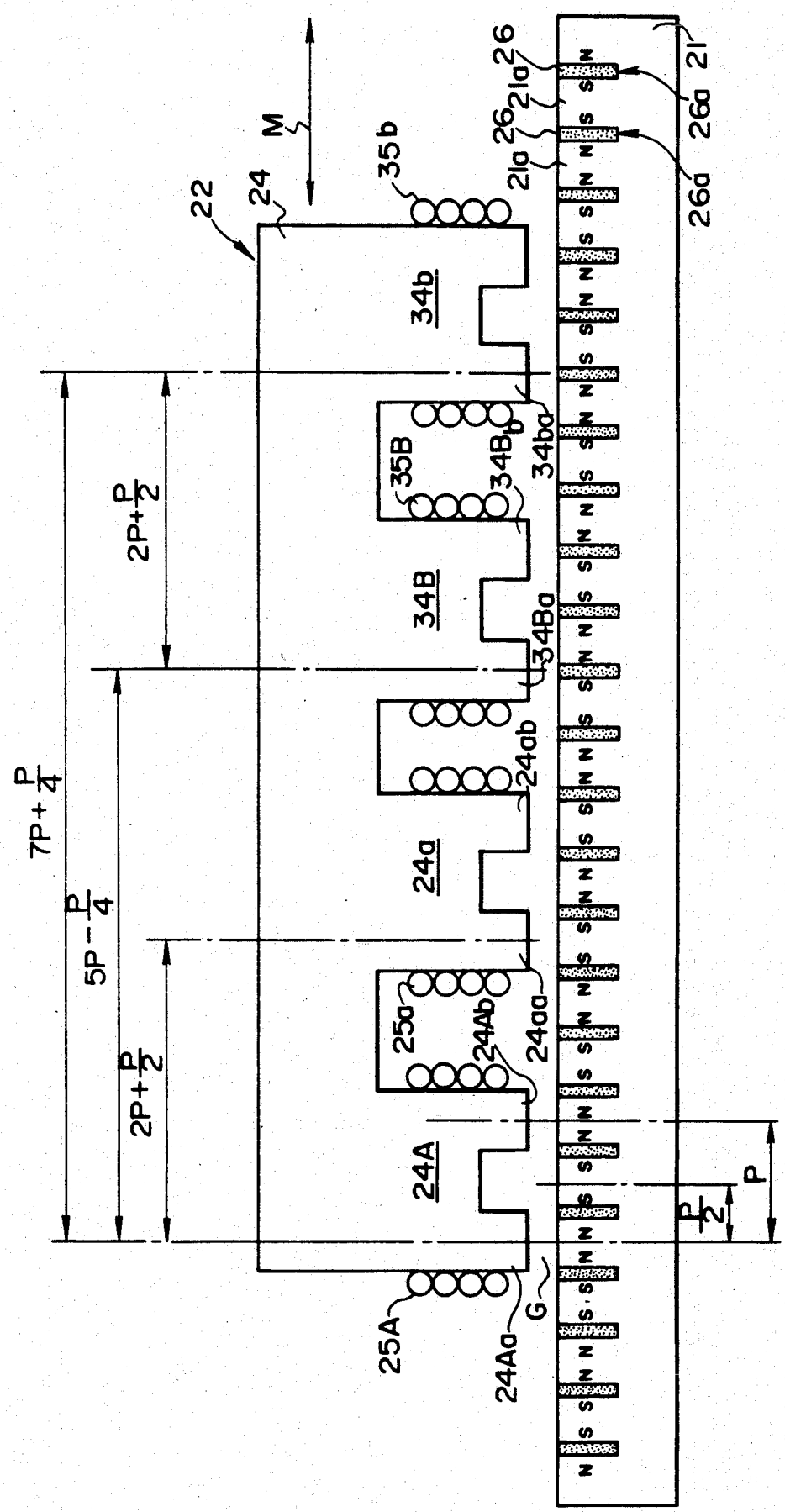
FIG. 26 is a side view showing a linear pulse motor constructed in accordance with an eleventh embodiment of the present invention.

FIG. 26 shows an eleventh embodiment of this invention. The feature of this embodiment is that permanent magnets are inserted into grooves formed within secondary magnetic member 21.

Similarly, the single-row of rectangular teeth 21a is formed in the longitudinal direction of secondary magnetic member 21. Each of the rectangular teeth 21a is formed at a constant pitch, at a distance of P/2, in the longitudinal direction, with grooves 26a being formed between rectangular teeth 21a. Permanent magnets 26 are then inserted into respective grooves 26a so that each of the adjacent permanent magnets 26 is of an opposite polarity.

On the other hand, primary magnetic member 22 comprises core 24 having +A-phase magnetic pole 24A, −A-phase magnetic pole 24a, +B-phase magnetic pole 34B, and −B-phase magnetic pole 34b. These magnetic poles are wound by means of coils 25A, 25a, 35B, and 35b, respectively. +A-phase magnetic pole 24A has rectangular teeth 24Aa and 24Ab, both of which are formed at a constant pitch, at a distance of P defined between each other, and formed in a direction transverse to the longitudinal direction. Similarly, −A-phase magnetic pole 24a has rectangular teeth 24aa and 24ab, and +B-phase magnetic pole 34B has rectangular teeth 34Ba and 34Bb, and −B-phase magnetic pole 34b has rectangular teeth 34ba and 34bb. These magnetic poles are spaced from secondary magnetic member 21 by means of a constant distance G as measured from the surface of secondary magnetic member 21.

In FIG. 26, all distances from the reference line, which comprises a vertical center line through pole tooth 24Aa, are similar to those of the construction of the first embodiment.

Figure 27:
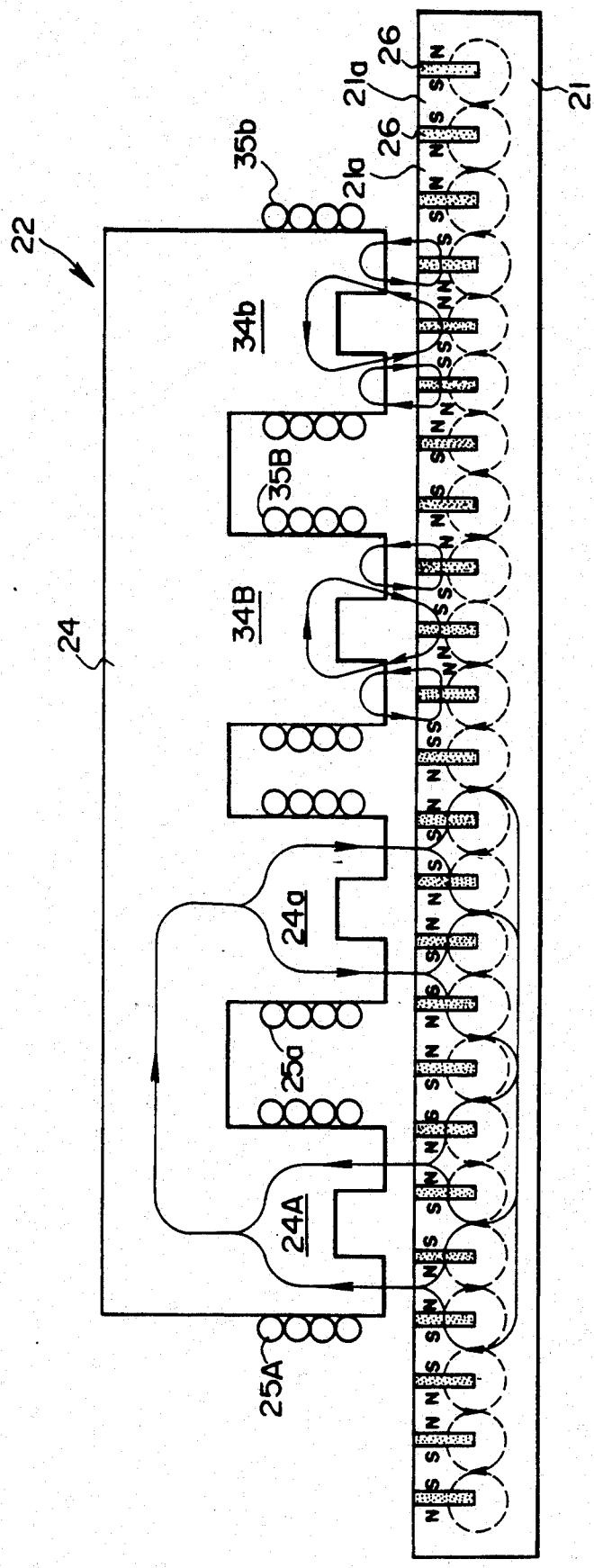
FIG. 27 is a side view showing the operation of the linear pulse motor of FIG. 26 when the coils are not energized.

FIG. 27 shows the state wherein primary magnetic member 22 is stationary with respect to secondary magnetic member 21 with the flow of magnetic flux between them. That is, when coils 25A, 25a, 35B, and 35b are not energized, magnetic flux loops are formed from the N-pole side of permanent magnets 26 to the S-pole side thereof, and also other magnetic flux loops are formed from rectangular teeth 21a so as to extend from the N-pole side of permanent magnets 26, to +A-phase magnetic pole 24A, −A-phase magnetic pole 24a, +B-phase magnetic pole 34B, and −B-phase magnetic pole 34b, and then be returned to rectangular teeth 21a through means of the S-pole sides of permanent magnets 26 after passing through the rectangular teeth of primary magnetic member 22.

The operation is described by reference to FIG. 28(a) to FIG. 28(d).

Figure 28A:
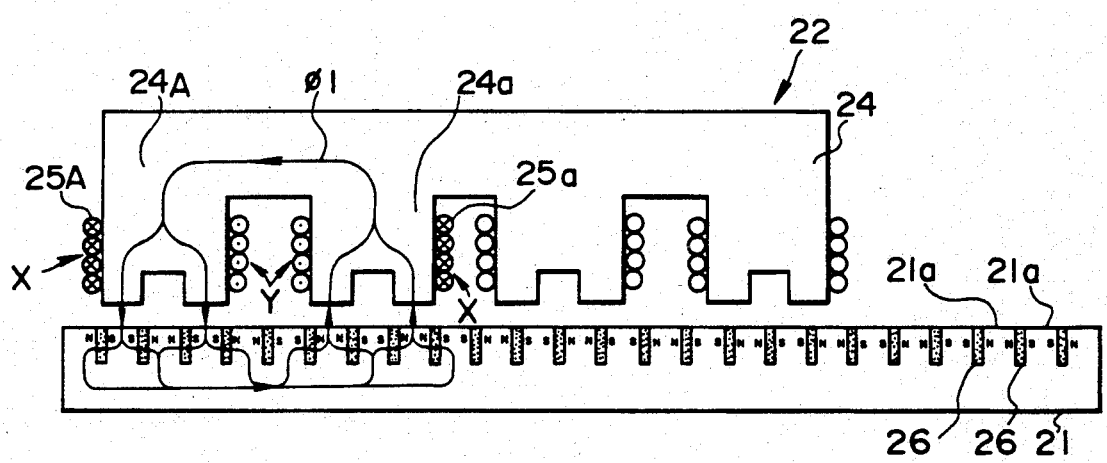
FIG. 28(a) to FIG. 28(d) are side views showing the operation of the linear pulse motor of FIG. 26 when the coils are energized in accordance with their various modes.

In FIG. 28(a), the pulse current flows from point X to point Y corresponding to coils 25A and 25a. This causes a magnetomotive force to be developed from −A-phase magnetic pole 24a to +A-phase magnetic pole 24A so as to generate a magnetic flux. This magnetic flux flows from rectangular teeth 24Aa to 24Ab into rectangular teeth 21a at the S-pole sides of such permanent magnets 26, and emerges from the N-pole sides of permanent magnets 26, then flows to the S-pole side of permanent magnets 26 disposed within the vicinity of rectangular teeth 24aa and 24ab, and also emerges from the N-pole sides of permanent magnets 26 so as to flow into rectangular teeth 24a a and 24a b and return to the −A-phase magnetic pole 24a. This constitutes magnetic flux loop $\phi_1$. Accordingly, all rectangular teeth 24Aa, 24Ab, and 24ab can contribute to the production of the magnetic thrust.

Figure 28B:
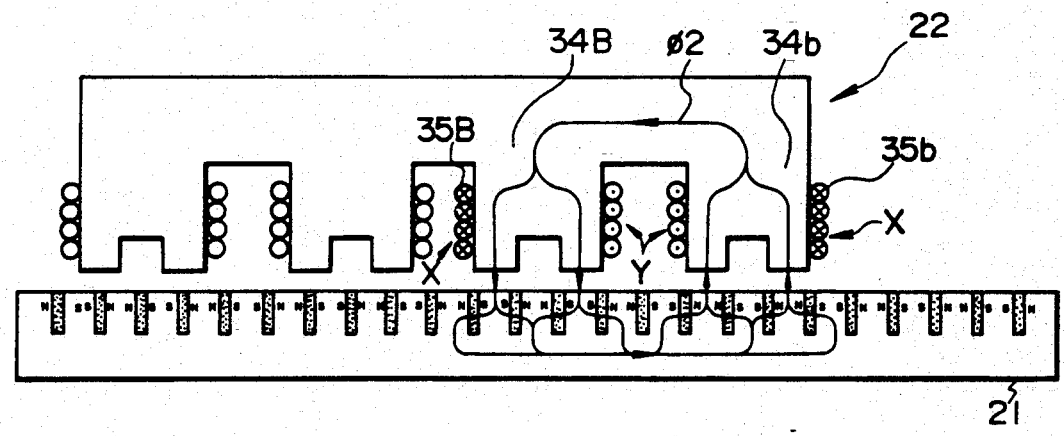
Figure 28C:
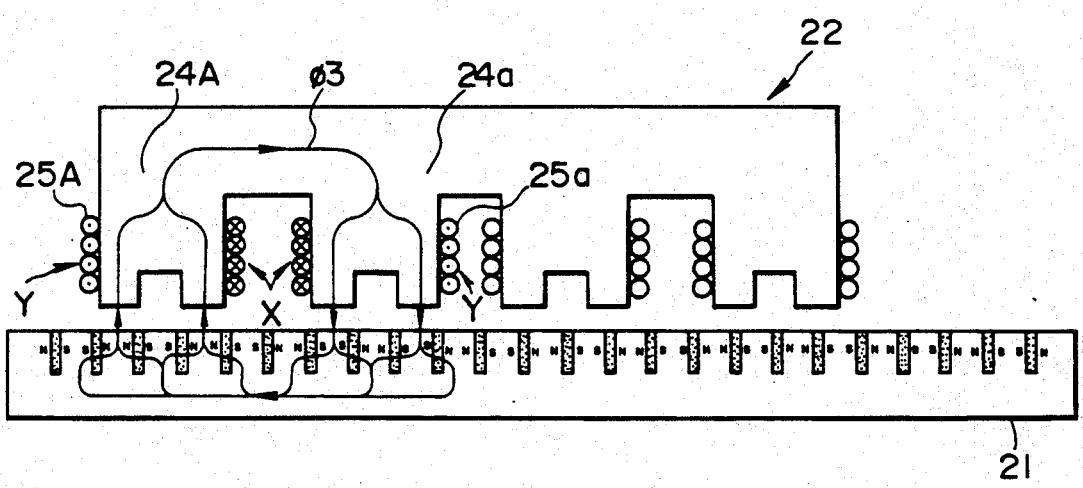
Figure 28D:
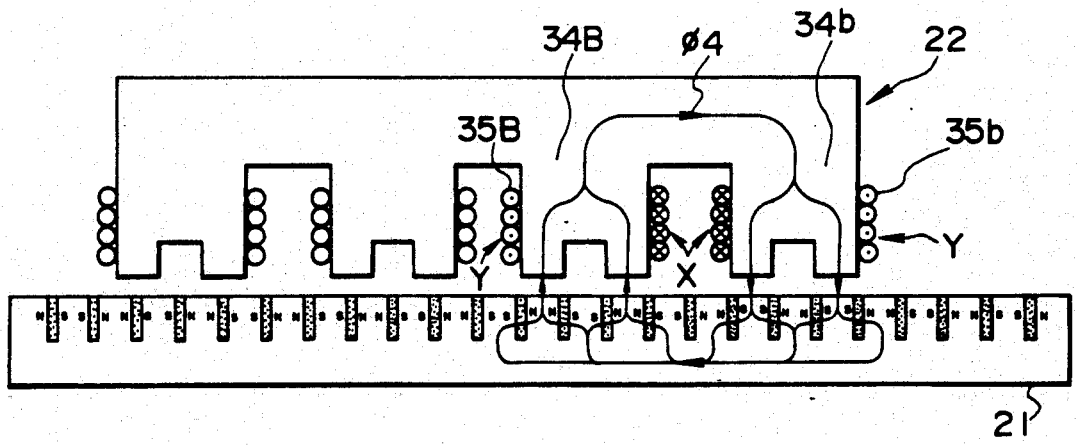

In FIG. 28(b), the pulse current flows from point X to point Y corresponding to coils 35B and 35b. A magnetic flux is generated from −B-phase magnetic pole 34b to +B-phase magnetic pole 34B. This magnetic flux flows into rectangular teeth 21a at the S-pole sides of permanent magnets 26 then flows to the S-pole sides of permanent magnets 26 disposed within the vicinity of −B-phase magnetic pole 34b, and also emerges from the N-pole sides of such permanent magnets 26, then flows into rectangular teeth 34ba and 34bb so as to return to −B-phase magnetic pole 34b. This constitutes magnetic flux loop $\phi_2$. Accordingly, all rectangular teeth 34Ba, 34B*b*, 34B*a*, and 34*bb* can contribute to the production of the magnetic thrust.

Similarly, in FIG. 28(*c*), the pulse current flows in coils 25A and 25*a* in the opposite direction with respect to the direction shown in FIG. 28(*a*), and in FIG. 28(*d*), the pulse current flows in coils 35B and 35*b* in the opposite direction with respect to the direction shown in FIG. 28(*b*), which constitute magnetic flux loops $\phi_3$ and $\phi_4$, respectively, so as to produce the magnetic thrust.

Assuming that the pulse current is supplied to the coils in the order of the parts shown in FIG. 28(*a*), FIG. 28(*b*), FIG. 28(*c*), FIG. 28(*d*), and FIG. 28(*a*), primary magnetic member 22 travels along secondary magnetic member 21, through means of a distance of P, toward the left as seen in the drawing. On the other hand, when supplying the pulse current to the coils in the order of the parts shown in FIG. 28(*d*), FIG. 28(*c*), FIG. 28(*b*), FIG. 28(*a*), and FIG. 28(*d*), primary magnetic member 22 travels toward the right as seen in the drawing.

Figure 29:
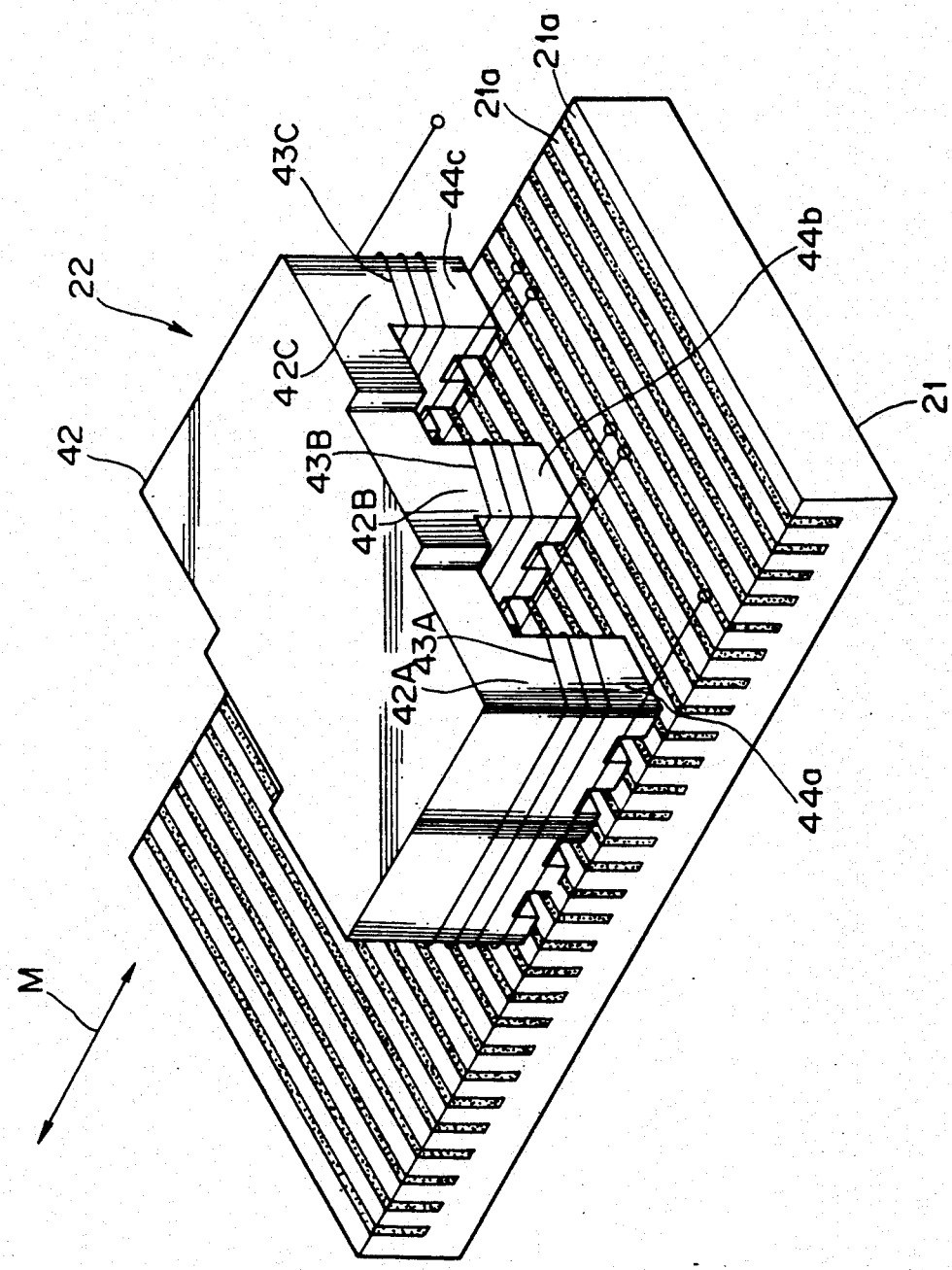
FIG. 29 is a perspective view showing a linear pulse motor constructed in accordance with a twelfth embodiment of the present invention.

FIG. 29 shows a twelfth embodiment of the invention. In this embodiment, secondary magnetic member 21 has a similar construction to that described in connection with the tenth embodiment, and therefore, only primary magnetic member 22 is described for this twelfth embodiment. This primary magnetic member 22 is of the three-phase type. This primary magnetic member 22 comprises core 42 having A-phase magnetic pole 42A wound by means of coil 43A, B-phase magnetic pole 42B wound by means of coil 43B, and C-phase magnetic pole 42C wound by means of coil 43C. A-phase magnetic pole 42A, B-phase magnetic pole 42B, and C-phase magnetic pole 42C have rectangular teeth 44*a*, 44*b*, and 44*c*, respectively. These rectangular teeth 44*a*, 44*b*, and 44*c* are formed at a constant pitch, at a distance of P, in the longitudinal direction. In addition, B-phase magnetic pole 42B is shifted by means of a distance of P/3 with respect to A-phase magnetic pole 42A, and C-phase magnetic pole 42C is shifted by means of a distance of P/3 with respect to B-phase magnetic pole 42B in the longitudinal direction. Thus, when rectangular teeth 44*a* are directly faced above rectangular teeth 21*a*, rectangular teeth 44*b* are shifted by means of a distance of P(1/3) with respect to rectangular teeth 21*a* and rectangular teeth 44*c* are shifted by means of a distance of P(2/3) with respect to rectangular teeth 21*a*.

Accordingly, when the pulse current is supplied to respective coils 43A, 43B, and 43C, primary magnetic member 22 travels along secondary magnetic member 21 in a manner similar to that which is already described with reference to FIG. 13 and FIG. 14 in connection with the fourth embodiment. In this case, all rectangular teeth 44*a*, 44*b*, and 44*c* can also contribute to the production of the magnetic thrust.

Figure 30:
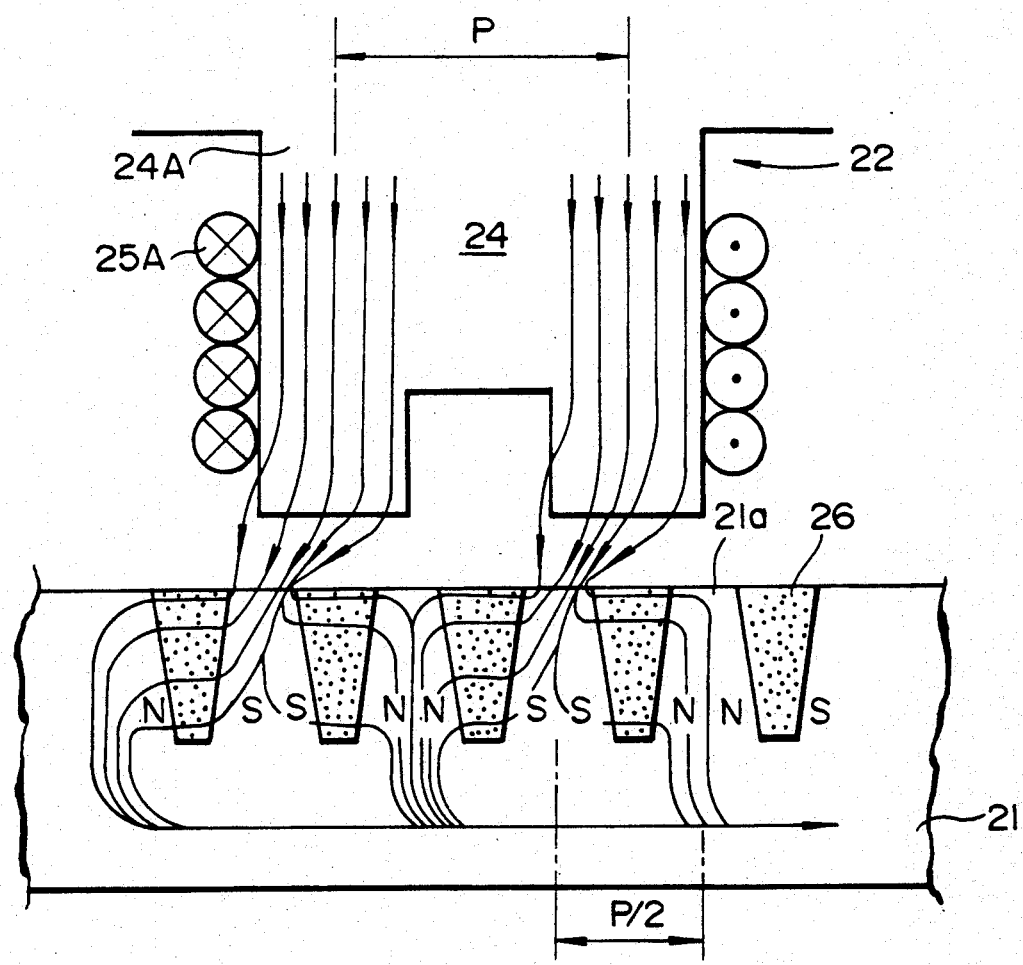
FIG. 30 is a side view showing a linear pulse motor constructed in accordance with a thirteenth embodiment of the present invention.
Figure 31:
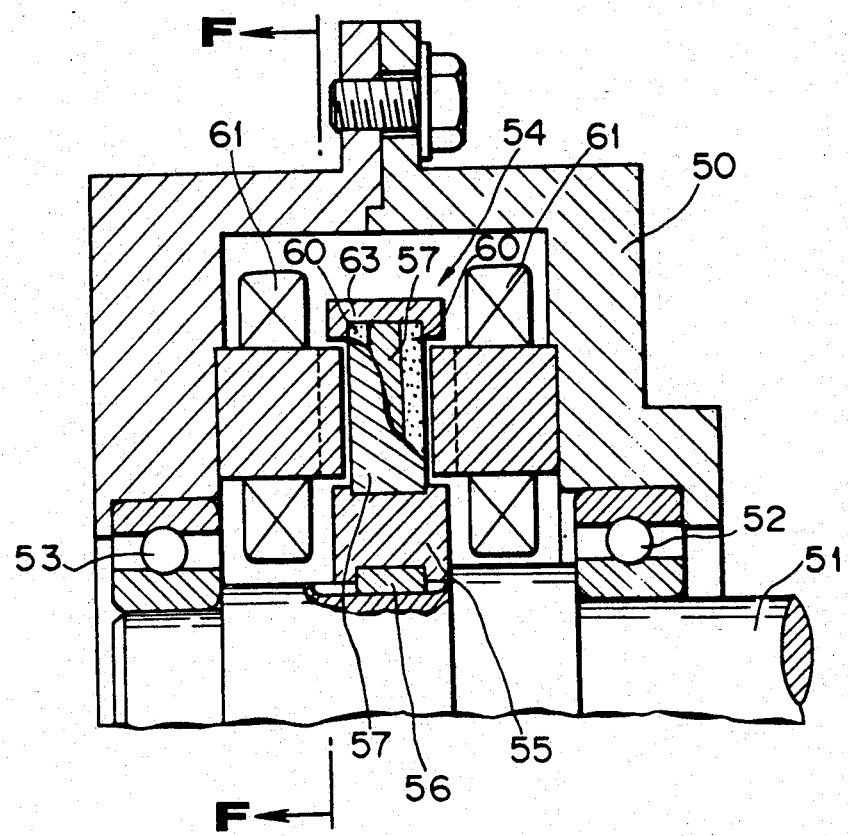
FIG. 31 is a section view, partially cut away, of a disk-rotor type pulse motor constructed in accordance with a fourteenth embodiment of the present invention.

FIG. 30 shows a thirteenth embodiment of the invention. The feature of this embodiment is that each permanent magnet 26 is of a wedge-shaped type having shorter and longer sides, both of which are parallel to each other, and wherein the magnets also have opposite sides inclined toward each other when viewed in cross section. Secondary magnetic member 21 has trough-shaped grooves 26*a* and rectangular teeth 21*a*, both of which are alternately formed in the direction transverse to the longitudinal direction thereof. Wedge-shaped permanent magnets 26 are then inserted into each groove 26*a* so that the shorter and inclined sides of each permanent magnet 26 are disposed in contact with the interior walls of grooves 26*a*, and the longer side thereof is disposed toward primary magnetic member 22 which is composed of core 24 having +A-phase magnetic pole 24A wound by means of coil 25A wound by means of coil 25A, only a part of primary magnetic member 22 being shown.

In this embodiment, the magnetic force is strongly exerted between the magnetic poles and rectangular teeth 21*a*, which is the same operation described in connection with the ninth embodiment.

FIGS. 31 to 34 show a fourteenth embodiment of the invention. This invention is partially similar to the ninth embodiment, and therefore, the same reference numerals are used in FIG. 31 so as to indicate the same structural components as shown in FIGS. 21 to 24, and consequently, only those features of this embodiment which are unique will be described in connection with this embodiment.

This pulse motor is of the disk-rotor type. In rotor 54, magnetic annular member 57 has grooves 58*a* formed upon both lateral surfaces thereof, which are extended along the radial direction of rotor 54, and permanent magnets 60 are then inserted into respective grooves 58*a* so that each of the adjacent permanent magnets 60 is of an opposite polarity.

Figure 33:
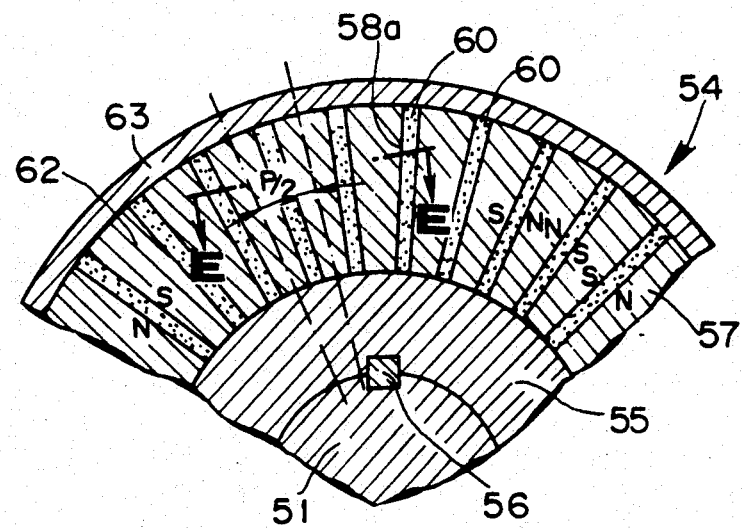
FIG. 33 is an enlarged side view, partially cut away, of the rotor of FIG. 31.
Figure 32:
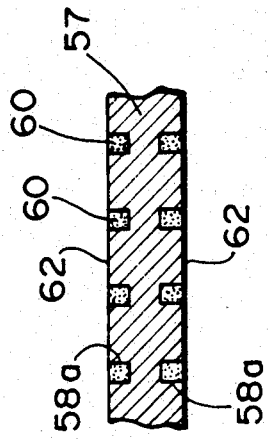
FIG. 32 is a section view of the disk-rotor of FIG. 33 as taken along lines 32—32 in FIG. 33.

In FIG. 33, segments 62 are formed with an outer arc which is longer than the inner arc, and at a constant pitch, at a distance of P/2, along a concentric circle whose radius is midway between the outer arc and the inner arc of segments 62, so that each radial axis of each segment 62 is intersected at the concentric circle. The peripheral surface of segments 62 or magnetic annular member 57 is then covered by means of an outer annular member 63.

Figure 34:
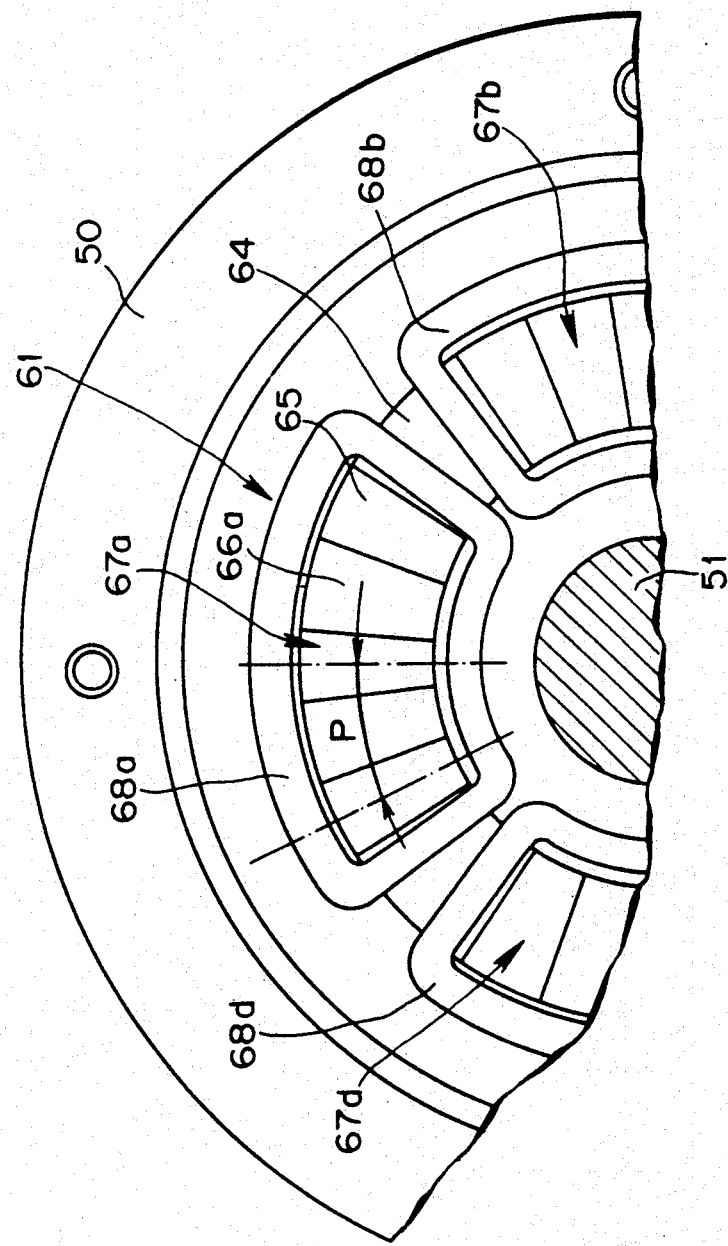
FIG. 34 is an enlarged sectional view, partially cut away, of the stator portion of FIG. 31 as taken along the lines 34—34 in FIG. 31.

FIG. 34 partially shows the details of stator 61. An annular type core 64 has rectangular teeth 65 and grooves 66*a* formed with these alternating at constant intervals and disposed in the radial direction. Each rectangular tooth 65 is formed at a constant pitch, at a distance of P, along a concentric circle whose radius is midway between an outer arc and an inner arc of rectangular teeth 65, in which each radial axis of each rectangular tooth 65 is intersected at the concentric circle. This disk-rotor type pulse motor has a similar operation as that described by means of reference to FIGS. 21 to 24 in connection with the ninth embodiment. In this case, the wedge-shaped permanent magnet which is shown in FIG. 30 can be used in this embodiment.

Figure 35:
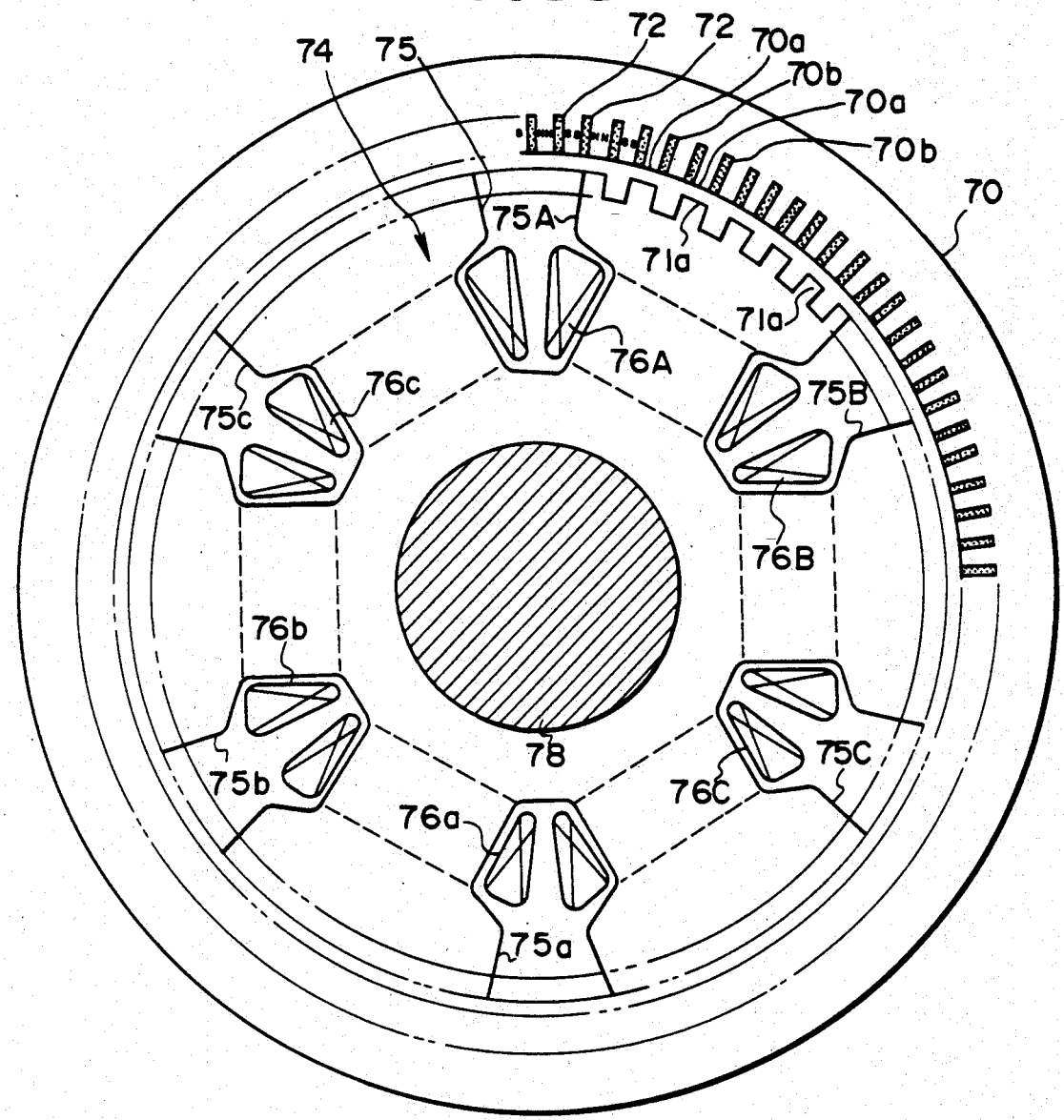
FIG. 35 is a simplified section view showing an outer-motor type pulse motor constructed in accordance with a fifteenth embodiment of the present invention.

FIG. 35 shows a fifteenth embodiment of the invention. This invention is partially similar to the tenth embodiment, and therefore, the same reference numerals are used in FIG. 35 to indicate the same structural features as those shown in FIG. 25, and only those unique features of this embodiment will be described in connection with this embodiment.

The pulse motor of this embodiment is of the outer-rotor type. Rotor 70 has rectangular teeth 70*a* and grooves 70*b* along an inner peripheral surface thereof. These rectangular teeth 70*a* are formed at a constant pitch, at a distance of P/2, along the inner peripheral surface thereof, in which each peripheral surface of each rectangular tooth 70*a* is intersected by means of respective radial axis of the particular rectangular tooth 70*a*. Permanent magnets 72 are then inserted into respective grooves 70*b* so that each of the adjacent permanent magnets 72 is of an opposite polarity.

Stator 74 has rectangular teeth 71*a* disposed along an outer peripheral surface thereof, these rectangular teeth 71 are formed at a constant pitch, at a distance of P, along the outer peripheral surface of stator 74, wherein each peripheral surface of each rectangular tooth 71a is intersected by means of each radial axis of the individual rectangular teeth 71a. The operation of this outer-rotor type pulse motor is similar in principle to that of the tenth embodiment. In this case, the wedge-shaped permanent magnet which is shown in FIG. 30 can be used in this embodiment.

Figure 36:
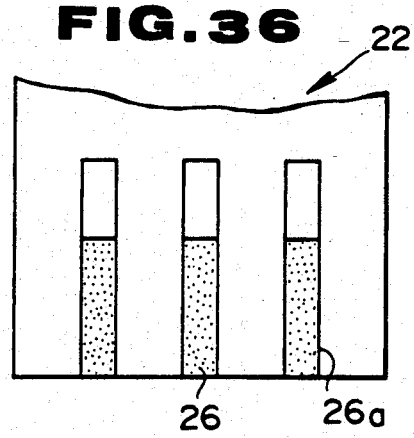
FIG. 36 is a side view showing a variant type of primary magnetic member.

FIG. 36 shows another type of primary magnetic member 22. In this case, permanent magnets 26 are inserted into grooves 26a so as to leave space at the most distal portion of each groove 26a. These spaces can be maintained as shown in the drawing, such as, for example, non-magnetic material can be inserted into the spaces. Furthermore, within the grooves formed by means of the secondary magnetic member, a space can be left at the most distal portion, and again, non-magnetic material can be inserted into such spaces.

In all embodiments described above, the constant pitch defined between the adjacent facing portions lacking a permanent magnet is twice that of the constant pitch defined between the adjacent facing portions having the permanent magnets, but one constant pitch can be twice that of the other constant pitch, plus or minus thirty percent.

The preferred embodiment described herein is illustrative and not restrictive; the scope of the invention is indicated by means of the appended claims and all variations which fall within such claims are intended to be embraced thereby.

What is claimed is:

1. In a strong magnetic thrust force type actuator, the combination comprising:

a primary magnetic member supported by a support means for movement along a first predetermined direction, said primary magnetic member generating a magnetic field from magnetic poles thereof, and a secondary magnetic member having a plurality of facing portions facing said magnetic poles of said primary magnetic member, in which said facing portions of said secondary magnetic member are disposed at a first constant pitch in said first predetermined direction, for moving said primary magnetic member relative to said secondary magnetic member when said magnetic field acts upon said facing portions of said second secondary magnetic member, the improvement comprising:

said primary magnetic member comprises:

a core member having a predetermined depth as measured in a second direction extending toward said secondary magnetic member, and a plurality of grooves defined within said core member so as to define within said core member a plurality of facing portions and a plurality of grooves alternately disposed at a second constant pitch in said first predetermined direction, said facing portions and said grooves of said core member extending in a direction transverse to said first predetermined direction and from an edge portion of said core member which is disposed toward said secondary magnetic member wherein said plurality of grooves and said plurality of facing portions of said core member have a predetermined depth in said second direction which comprises only a fraction of said predetermined depth of said core member so as to be disposed within said core member only within the vicinity of said secondary magnetic member;

a plurality of permanent magnets inserted into respective ones of said grooves of said core member in a perpendicular direction from said edge portion of said core member so that each one of adjacent ones of said permanent magnets is of an opposite polarity; and an insulated wire wound around said core member so as to form a magnetic pole; and wherein further, said secondary magnetic member comprises:

said facing portions of said secondary magnetic member are disposed toward said facing portions of said core member, said facing portions of said secondary magnetic member being disposed at said first constant pitch in said first predetermined direction which is approximately twice as large as said second constant pitch of said facing portions formed within said core member of said primary magnetic member.

2. A strong magnetic thrust force type actuator according to claim 1 wherein the second constant pitch is twice that of the first constant pitch, plus or minus approximately thirty percent.

3. A strong magnetic thrust force type actuator according to claim 1 wherein the permanent magnets are inserted into respective grooves so as to leave a space at the most distal portion of each groove.

4. A strong magnetic thrust force type actuator according to claim 3 wherein a non-magnetic material is inserted into the non-occupied spaces of the grooves.

5. A strong magnetic thrust force type actuator according to claim 1 wherein two identical primary magnetic members are connected by a connecting means at a predetermined distance therebetween in the predetermined direction.

6. A strong magnetic thrust force type actuator according to claim 1 wherein the primary magnetic member comprises:

the core member has three projections in the direction transverse to the predetermined direction, each projection having facing portions and grooves alternately disposed at the first constant pitch in the predetermined direction; and the insulated is wound around the middle projection so as to form magnetic poles, and wherein the secondary magnetic member comprises:

three rows of facing portions disposed toward the facing portions of the respective projections of said core member, said three rows of facing portions being disposed at the second constant pitch in the predetermined direction, in which each facing portion of the middle-row is shifted by ½ of the second constant pitch with respect to each facing portion of the other two rows in the predetermined direction.

7. A strong magnetic thrust force type actuator according to claim 6 wherein two identical primary magnetic members are connected by a connecting means at a predetermined distance therebetween in the predetermined direction.

8. A strong magnetic thrust force type actuator according to claim 1 wherein the primary magnetic member comprises four identical primary magnetic members arranged in a square magnetic plate with one primary magnetic member being disposed at each corner of the square magnetic plate.

9. A strong magnetic thrust force type actuator according to claim 1 wherein the primary magnetic member comprises:

the core member has a plurality of projections in the predetermined direction, each projection having facing portions and grooves alternately disposed at a first constant pitch in the predetermined direction; and the insulated wire is wound around said respective projections so as to form magnetic poles.

10. A strong magnetic thrust force type actuator according to claim 1 wherein the primary magnetic member comprises:

the core member has three projections in the direction transverse to the predetermined direction, each projection having facing portions and grooves alternately disposed at the first constant pitch in the predetermined direction; and the insulated wire is wound around said respective projections so as to form magnetic poles, and wherein the secondary magnetic member comprises:

three rows of facing portions disposed toward to the facing portions of said respective projections of said core member, respective facing portions of the three rows being disposed at the second constant pitch in the predetermined direction, in which each facing portion of a second row is shifted by ⅓ of the second constant pitch with respect to each facing portion of a first row, and each facing portion of a third row is shifted by ⅓ of the second constant pitch with respect to each facing portion of the second row in the predetermined direction.

11. A strong magnetic thrust force type actuator according to claim 1 wherein the primary magnetic member comprises:

an annular core member having facing portions and grooves alternately disposed along a first constant arc length defined upon a circular lateral surface thereof, wherein the facing portions and grooves extend in a radial direction of the circular lateral surface thereof; and a plurality of windings disposed along a concentric circle of the circular lateral surface of the annular core member so as to form magnetic poles, and wherein the secondary magnetic member comprises:

the facing portions disposed toward to the facing portions of the annular core member, the facing portions of said secondary magnetic member being disposed at a second constant arc length along a circular lateral surface of the secondary magnetic member.

12. A strong magnetic thrust force type actuator according to claim 11 wherein said primary magnetic member comprises a pair of axially spaced primary magnetic members, and the secondary magnetic member is of a back-to-back type rotor, one side of which faces one primary magnetic member, and the other side of which faces the other primary magnetic member, respectively, which rotate the secondary magnetic member as a result of the primary magnetic members being actuated.

13. A strong magnetic thrust force type actuator according to claim 1 wherein the primary magnetic member comprises:

an annular core member having facing portions and grooves alternately disposed along a first constant arc length defined upon an outer peripheral surface thereof;

the permanent magnets are inserted into respective grooves in a radial direction from a facing surface of each facing portion so that each of the adjacent permanent magnets is of the opposite polarity; and a plurality of windings disposed along a concentric circle of a circular lateral surface of the annular core member so as to form magnetic poles, and wherein the secondary magnetic member comprises:

the facing portions are disposed toward to the facing portions of the annular core member, the facing portions of said secondary magnetic member being disposed at a second constant arc length along an inner peripheral surface of the secondary magnetic member, whereby the secondary magnetic member is rotated by activating the primary magnetic member.

14. A strong magnetic thrust force type actuator according to claim 3, wherein each permanent magnet is of a wedge-shaped plate type having shorter and longer sides, both of which are parallel to each other, and having opposite sides inclined toward each other in cross section, and the primary magnetic member has a plurality of trough-shaped grooves, each of which is alternately formed in a direction transverse to the predetermined direction thereof, whereby each permanent magnet is inserted into each trough-shaped groove so that the longer side of each permanent magnet faces the secondary magnetic member.

15. In a strong magnetic thrust force type actuator, the combination comprising:

a primary magnetic member supported by a support means for movement along a first predetermined direction, said primary magnetic member generating a magnetic field from magnetic poles thereof; and a secondary magnetic member having a plurality of facing portions facing said magnetic poles of said primary magnetic member, in which said facing portions of said secondary magnetic member are disposed at a first constant pitch in said first predetermined direction for moving said primary magnetic member relative to said secondary magnetic member when said magnetic field acts upon said facing portions of said secondary magnetic member, the improvement comprising:

said primary magnetic member comprises:

a core member having facing portions disposed at a second constant pitch in said predetermined direction, said facing portions of said core member extending in a direction transverse to said first predetermined direction; and an insulated wire wound around said core member so as to form a magnetic pole; and wherein further, said secondary magnetic member has a predetermined depth as measured in a second direction extending toward said primary magnetic member and comprises:

a plurality of grooves defined within said secondary magnetic member so as to define within said secondary magnetic member a plurality of facing portions and a plurality of grooves disposed toward said facing portions of said core member, said facing portions and said grooves of said secondary magnetic member being alternately disposed at said first constant pitch in said first predetermined direction and extending in a direction transverse to said first predetermined direction from an edge portion of said secondary magnetic member which is disposed toward said primary magnetic member wherein said plurality of said facing portions and said grooves of said secondary magnetic member have a predetermined depth in said second direction which comprises only a fraction of said predetermined depth of said secondary magnetic member so as to be disposed within said secondary magnetic member only within the vicinity of said primary magnetic member; and a plurality of permanent magnets inserted into respective ones of said grooves of said secondary magnetic member in a perpendicular direction from said edge portion of said secondary magnetic member so that each one of adjacent ones of said permanent magnets is of an opposite polarity, and wherein said second constant pitch of said facing portions of said core member is approximately twice as large as said first constant pitch of said facing portions of said secondary magnetic member.

16. A strong magnetic thrust force type actuator according to claim 15 wherein the first constant pitch is twice that of the second constant pitch, plus or minus thirty percent.

17. A strong magnetic thrust force type actuator according to claim 15 wherein the permanent magnets are inserted into respective grooves so as to leave a space at the most distal portion of each groove.

18. A strong magnetic thrust force type actuator according to claim 17 wherein a non-magnetic material is inserted into the non-occupied space of each groove.

19. A strong magnetic thrust force type actuator according to claim 15 wherein the primary magnetic member comprises:

the core member has a plurality of projections in the predetermined direction, each projection having facing portions disposed at the first constant pitch in the predetermined direction; and the insulated wire is wound around respective projections so as to form magnetic poles.

20. A strong magnetic thrust force type actuator according to claim 15 wherein the primary magnetic member comprises:

the core member has three projections in the direction transverse to the predetermined direction, each projection having facing portions disposed at the first constant pitch in the predetermined direction, in which a second projection among said three projections is shifted by ⅓ of the first constant pitch with respect to a first projection in the predetermined direction, and a third projection among the three projections is shifted by ⅓ of the first constant pitch with respect to the second projection in the predetermined direction; and the insulated wire is wound around the respective projections so as to form magnetic poles.

21. A strong magnetic thrust force type actuator according to claim 15 wherein the primary magnetic member comprises:

an annular core member having facing portions disposed along a first constant arc length defined upon circular lateral surface thereof; and a plurality of windings disposed along a concentric circle of the circular lateral surface of the annular core member so as to form magnetic poles, and the secondary magnetic member comprises:

the facing portions and grooves disposed toward the facing portions of the annular core member, the facing portions and grooves of said secondary magnetic member being alternately disposed at a second constant arc length along a circular lateral surface of the secondary magnetic member, the facing portions and grooves of said secondary magnetic member extending in a radial direction of the circular lateral surface of the secondary magnetic member.

22. A strong magnetic thrust force type actuator according to claim 21 wherein said primary magnetic member comprises a pair of axially spaced primary magnetic members, and the secondary magnetic member comprises a back-to-back type rotor, one side of which faces one primary magnetic member, and the other side of which faces the other primary magnetic member, respectively, which rotate the secondary magnetic member as a result of the primary magnetic member being activated.

23. A strong magnetic thrust force type actuator according to claim 15 wherein the primary magnetic member comprises:

an annular core member having facing portions disposed along a first constant arc length defined upon an outer peripheral surface thereof; and a plurality of windings disposed along a concentric circle of a circular lateral surface of the annular core member so as to form magnetic poles, and the secondary magnetic member comprises:

the facing portions and grooves disposed toward to the facing portions of the annular core member, said facing portions and grooves of said secondary magnetic member being alternately disposed at a second constant arc length along an inner peripheral surface of the secondary magnetic member; and the permanent magnets are inserted into respective grooves in a radial direction from a facing surface of each facing portion of said secondary magnetic member so that each of the adjacent permanent magnets is of the opposite polarity, whereby the secondary magnetic member is rotated as a result the primary magnetic member being activated.

24. A strong magnetic thrust force type actuator according to claim 17, wherein each permanent magnet is of a wedge-shaped plate type having shorter and longer sides, both of which are parallel to each other, and having opposite sides inclined toward each other in cross section thereof, and the secondary magnetic member has a plurality of trough-shaped grooves, each of which is alternately formed in a direction transverse to the predetermined direction thereof, whereby each permanent magnet is inserted into each trough-shaped groove so that the longer side of each permanent magnet is disposed toward the primary magnetic member.

* * * * *